(12) United States Patent
Itoh et al.

(10) Patent No.: US 9,049,323 B2
(45) Date of Patent: Jun. 2, 2015

(54) DATA PROCESSING APPARATUS, CONTENT DISPLAYING METHOD, AND NON-TRANSITORY COMPUTER-READABLE RECORDING MEDIUM ENCODED WITH CONTENT DISPLAYING PROGRAM

(71) Applicant: Konica Minolta, Inc., Chiyoda-ku (JP)

(72) Inventors: Ayumi Itoh, Takarazuka (JP); Masayuki Kawamoto, Amagasaki (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 0 days.

(21) Appl. No.: 14/176,203

(22) Filed: Feb. 10, 2014

(65) Prior Publication Data
US 2014/0233059 A1   Aug. 21, 2014

(30) Foreign Application Priority Data

Feb. 20, 2013   (JP) ................................. 2013-031448

(51) Int. Cl.
| | |
|---|---|
| G06F 3/12 | (2006.01) |
| H04N 1/00 | (2006.01) |
| G06F 3/0488 | (2013.01) |
| G06F 3/0484 | (2013.01) |
| G06K 15/00 | (2006.01) |

(52) U.S. Cl.
CPC .......... *H04N 1/00411* (2013.01); *G06F 3/0488* (2013.01); *G06F 3/04845* (2013.01); *G06F 2203/04808* (2013.01)

(58) Field of Classification Search
None
See application file for complete search history.

(56) References Cited

U.S. PATENT DOCUMENTS

| | | |
|---|---|---|
| 2006/0001650 A1 | 1/2006 | Robbins et al. |
| 2010/0070915 A1 | 3/2010 | Tsutsui et al. |
| 2010/0277419 A1 | 11/2010 | Ganey et al. |

(Continued)

FOREIGN PATENT DOCUMENTS

| | | |
|---|---|---|
| JP | 2007-328506 A | 12/2007 |
| JP | 2008-070968 A | 3/2008 |

(Continued)

OTHER PUBLICATIONS

The extended European Search Report issued on Apr. 2, 2014, by the European Patent Office in corresponding European Patent Application No. 14154622.6-1959. (7 pages).

(Continued)

*Primary Examiner* — Dov Popovici
(74) *Attorney, Agent, or Firm* — Buchanan Ingersoll & Rooney PC

(57) ABSTRACT

A data processing apparatus includes a position detecting portion capable of detecting a position designated by a user, and a control portion which includes a content displaying portion to display a display area of content and a gesture event determining portion to determine a gesture event. The content displaying portion includes a display image generating portion, and a display control portion to display the display image. The display image generating portion includes a state storing portion to store state information for specifying the display area at a time point of start of a gesture period, and a prioritized displaying portion operable, when a first gesture event changing the display area and a second gesture event not changing the display area are determined during the gesture period, to generate a display image for displaying the display area specified by the state information, on the basis of the second gesture event.

24 Claims, 14 Drawing Sheets

(56) References Cited

U.S. PATENT DOCUMENTS

2012/0299852 A1* 11/2012 Hsu et al. .................. 345/173
2013/0031516 A1* 1/2013 Sawayanagi et al. ......... 715/863

FOREIGN PATENT DOCUMENTS

| JP | 2010-0072754 A | 4/2010 |
| JP | 2012-203440 A | 10/2012 |
| KR | 2010-0083432 A | 7/2010 |

OTHER PUBLICATIONS

Office Action (Notice of Ground of Rejection) issued on Dec. 9, 2014, by the Japanese Patent Office in corresponding Japanese Patent Application No. 2013-031448, and an English translation of the Office. (6 pages).

* cited by examiner

F I G. 4
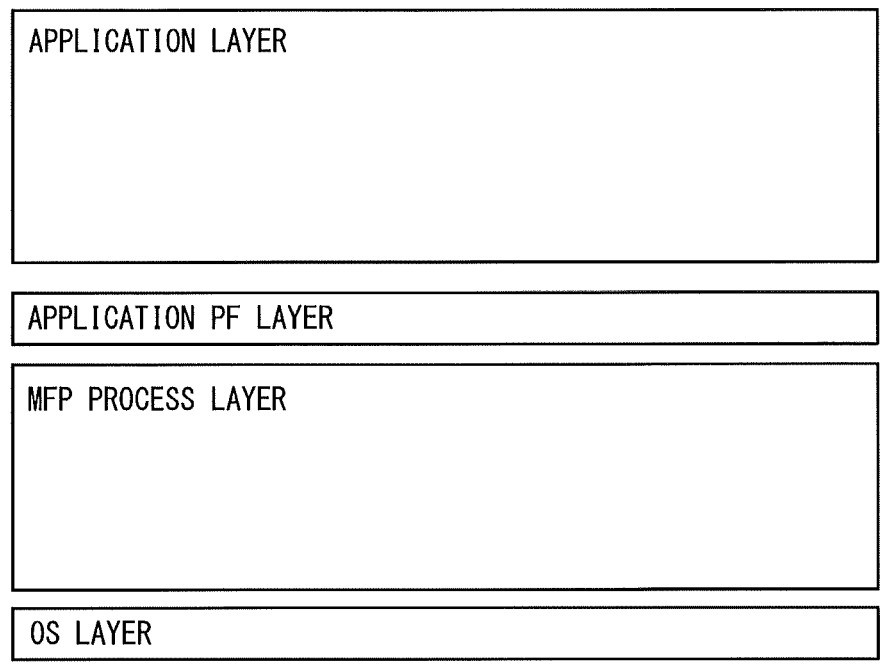

FIG. 6

MASTER TABLE 99

| PROCESS | GESTURE |
|---|---|
| PAGE TURNING | SWIPE |
| ENLARGEMENT | PINCH OUT |
| REDUCTION | PINCH IN |
| ROTATION | ROTATION |
| SCROLL | FLICK |
| | DOUBLE FLICK |

DATA PROCESSING APPARATUS, CONTENT DISPLAYING METHOD, AND NON-TRANSITORY COMPUTER-READABLE RECORDING MEDIUM ENCODED WITH CONTENT DISPLAYING PROGRAM

This application is based on Japanese Patent Application No. 2013-031448 filed with Japan Patent Office on Feb. 20, 2013, the entire content of which is hereby incorporated by reference.

BACKGROUND OF THE INVENTION

1. Field of the Invention

The present invention relates to a data processing apparatus, a content displaying method, and a non-transitory computer-readable recording medium encoded with a content displaying program. More particularly, the present invention relates to a data processing apparatus provided with a touch panel, a content displaying method performed by the data processing apparatus, and a non-transitory computer-readable recording medium encoded with a content displaying program for causing a computer to perform the content displaying method.

2. Description of the Related Art

Some recent data processing apparatuses, typified by multi-function peripherals (MFPs), are provided with a touch panel as a user interface. Touch panels can detect two positions designated by a user with two fingers. When the user moves the two fingers while designating the positions, some touch panels further detect a plurality of types of operations, in accordance with the moving directions of the two positions.

For example, Japanese Patent Laid-Open No. 2012-203440 describes an information processing apparatus which includes: a position detecting portion which detects one or more input positions; a setting portion which sets, around each of the input positions, a plurality of regions bounded by lines each passing through the corresponding input position; and an operation detecting portion which detects a moving direction of at least one of the input positions on the basis of the region residing in the moving direction of the input position and detects the type of the operation responsive to the detected moving direction of the input position. According to this conventional technique, in the case where the moving directions of the two input positions, with respect to the input positions for which the regions have been set, correspond to the directions of the regions residing in opposite directions from each other along a first axis which passes through the two input positions, it is detected that a pinch operation has been performed. In the case where the moving directions of the two input positions correspond to the directions of the regions residing in opposite directions from each other along a second axis which is orthogonal to the first axis, it is detected that a rotation operation has been performed.

However, two operations may be detected simultaneously. For example, when a process for changing the size of an image is performed by a pinch operation and a process for changing the direction of display of the image is performed by a rotation operation, even in the case where a user is intended to designate only the rotation operation, if the spacing between the user's two fingers is changed, the pinch operation may also be detected. In this case, not only the display direction of the image, but also the size of the image will be changed. This gives the user the sense of non-user-friendliness because the size of the image is changed despite the user's intention of designating the rotation operation alone.

SUMMARY OF THE INVENTION

An aspect of the present invention provides a data processing apparatus including a display portion capable of displaying an image, a position detecting portion capable of detecting one or more positions designated by a user on a display surface of the display portion, and a control portion, wherein the control portion includes: a content displaying portion to display, on the display portion, a display area corresponding to at least a part of content; and a gesture event determining portion operable to determine at least one of a plurality of gesture events on the basis of the one or more positions detected by the position detecting portion; the content displaying portion including a display image generating portion to generate a display image for displaying the display area on the basis of the at least one gesture event determined by the gesture event determining portion, and a display control portion to display the generated display image on the display portion, the display image generating portion including a state storing portion to temporarily store state information for specifying the display area at a time point of start of a gesture period during which one or more positions are continuously detected by the position detecting portion, and a prioritized displaying portion operable, in the case where a first gesture event corresponding to a process involving a change of the display area and a second gesture event corresponding to a process involving no change of the display area are determined during the gesture period by the gesture event determining portion, to generate a display image for displaying the display area specified by the stored state information, on the basis of the second gesture event.

Another aspect of the present invention provides a content displaying method performed by a data processing apparatus, the data processing apparatus including a display portion capable of displaying an image and a position detecting portion capable of detecting one or more positions designated by a user on a display surface of the display portion, wherein the method causes the data processing apparatus to perform: a content displaying step of displaying, on the display portion, a display area corresponding to at least a part of content; and a gesture event determining step of determining at least one of a plurality of gesture events on the basis of the one or more positions detected by the position detecting portion; the content displaying step including a display image generating step of generating a display image for displaying the display area on the basis of the at least one gesture event determined in the gesture event determining step, and a display control step of displaying the generated display image on the display portion, the display image generating step including a state storing step of temporarily storing state information for specifying the display area at a time point of start of a gesture period during which one or more positions are continuously detected by the position detecting portion, and a prioritized displaying step of, in the case where a first gesture event corresponding to a process involving a change of the display area and a second gesture event corresponding to a process involving no change of the display area are determined during the gesture period in the gesture event determining step, generating a display image for displaying the display area specified by the stored state information, on the basis of the second gesture event.

Yet another aspect of the present invention provides a non-transitory computer-readable recording medium encoded with a content displaying program performed by a computer which controls a data processing apparatus, the data processing apparatus including a display portion capable of displaying an image and a position detecting portion capable of detecting one or more positions designated by a user on a display surface of the display portion, wherein the program causes the computer to perform: a content displaying step of displaying, on the display portion, a display area corresponding to at least a part of content; and a gesture event determining step of determining at least one of a plurality of gesture events on the basis of the one or more positions detected by the position detecting portion; the content displaying step including a display image generating step of generating a display image for displaying the display area on the basis of the at least one gesture event determined in the gesture event determining step, and a display control step of displaying the generated display image on the display portion, the display image generating step including a state storing step of temporarily storing state information for specifying the display area at a time point of start of a gesture period during which one or more positions are continuously detected by the position detecting portion, and a prioritized displaying step of, in the case where a first gesture event corresponding to a process involving a change of the display area and a second gesture event corresponding to a process involving no change of the display area are determined during the gesture period in the gesture event determining step, generating a display image for displaying the display area specified by the stored state information, on the basis of the second gesture event.

The foregoing and other features, aspects, and advantages of the present invention will become more apparent from the following detailed description of the present invention when taken in conjunction with the accompanying drawings.

BRIEF DESCRIPTION OF THE DRAWINGS

FIG. 4 shows an example of the software architecture of a CPU included in the MFP;

FIG. 6 shows an example of a master table;

DESCRIPTION OF THE PREFERRED EMBODIMENTS

Figure 1:
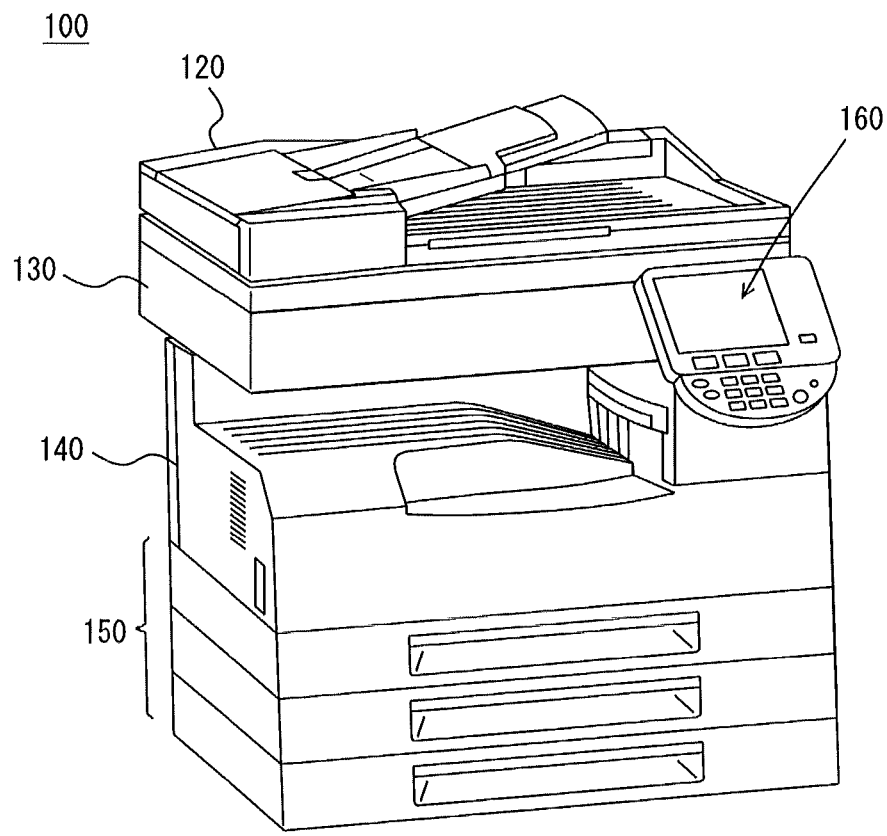
FIG. 1 is a perspective view of an MFP according to an embodiment of the present invention.

The preferred embodiments of the present invention will be described below in conjunction with the drawings. In the following description, the same or corresponding parts are denoted by the same reference characters. Their names and functions are also the same. Thus, detailed descriptions thereof will not be repeated.

Figure 2:
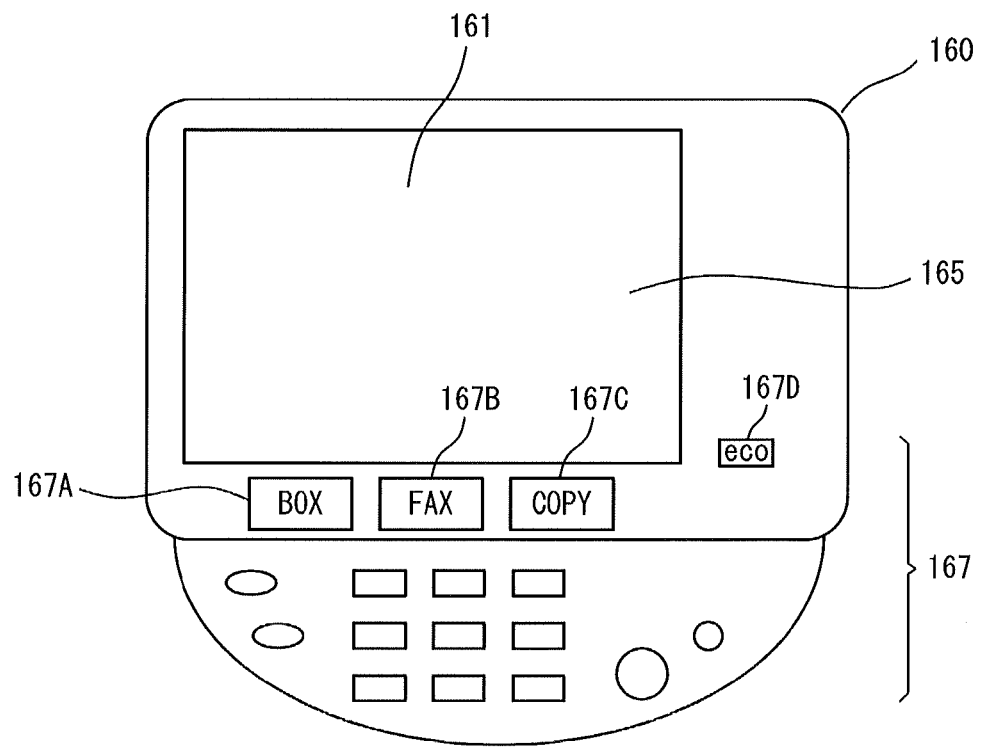
FIG. 2 is a plan view showing an example of an operation panel.

FIG. 1 is a perspective view of an MFP according to an embodiment of the present invention. FIG. 2 is a plan view showing an example of an operation panel. Referring to FIGS. 1 and 2, an MFP 100, which is an example of a data processing apparatus, includes: a document reading portion 130 for reading a document; an automatic document feeder 120 for feeding a document to document reading portion 130; an image forming portion 140 for forming an image on a sheet of paper or the like on the basis of image data which is output from document reading portion 130 that has read a document; a paper feeding portion 150 for feeding a sheet of paper to image forming portion 140; and an operation panel 160 serving as a user interface.

Operation panel 160 is arranged on an upper surface of MFP 100. Operation panel 160 includes a display portion 161, a touch panel 165, and a hard key portion 167. Display portion 161 is, for example, a liquid crystal display (LCD), and displays an instruction menu for a user, information about acquired image data, and so on. A user is supposed to stay upright while operating MFP 100. Therefore, the display surface of display portion 161 and the operation surface of touch panel 165 are arranged to face upward, so that the user can readily recognize the content displayed on the display surface of display portion 161 and make a motion for designating a position on the touch panel with his/her finger.

Hard key portion 167 includes four hard keys 167A to 167D having the characters "BOX", "FAX", "COPY", and "ECO" respectively displayed thereon. Touch panel 165 is a multi-touch-capable touch panel which is disposed on an upper or lower surface of display portion 161. Touch panel 165 detects the position(s) designated by a user on the display surface of display portion 161. The user operations of designating touch panel 165 include a multi-touch operation, in which a user uses a plurality of fingers to designate a plurality of locations on touch panel 165 simultaneously, and a single-touch operation, in which a user uses one finger to designate one location at a time.

Automatic document feeder 120 automatically feeds a plurality of documents set on a document feed tray, one by one, to a predetermined document reading position set on a platen glass of document reading portion 130, and outputs the document, the image of which has been read by document reading portion 130, onto a document output tray. Document reading portion 130 includes an optical source which irradiates a document placed on the document reading position with light and a photoelectric conversion element which receives the light reflected from the document, and scans a document image having a size corresponding to that of the document. The photoelectric conversion element converts the received light into image data made up of electric signals, and outputs the image data to image forming portion 140. Paper feeding portion 150 feeds a sheet of paper, stored in a paper feed tray, to image forming portion 140.

Image forming portion 140 forms an image using well-known electrophotography. Image forming portion 140 performs various kinds of data processing such as shading compensation on the image data received from document reading portion 130 and, on the basis of the processed image data, or on the basis of externally received image data, forms an image on a sheet of paper fed by paper feeding portion 150.

Figure 3:
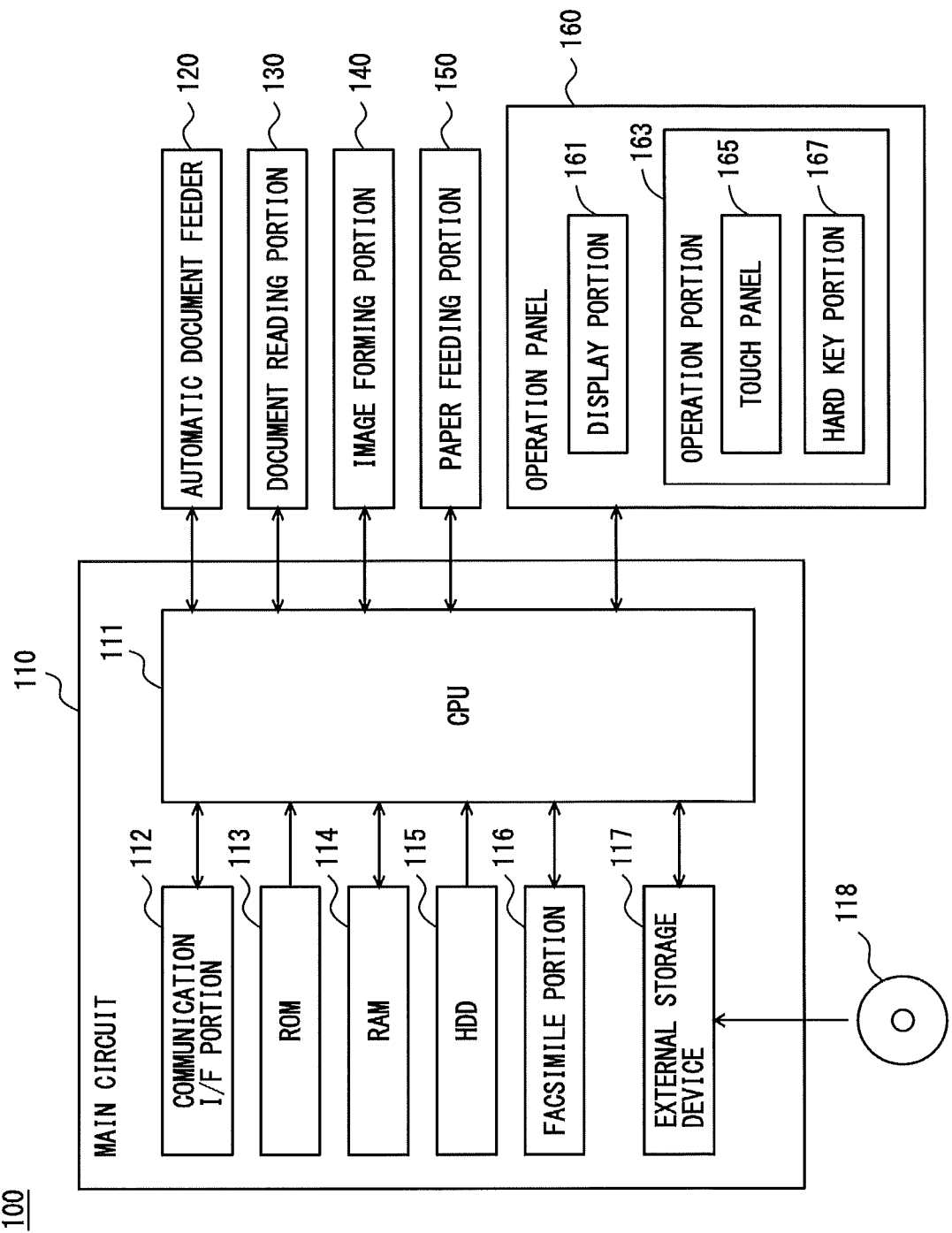
FIG. 3 is a block diagram schematically showing an example of the hardware configuration of the MFP.

FIG. 3 is a block diagram schematically showing an example of the hardware configuration of the MFP. Referring to FIG. 3, MFP 100 includes a main circuit 110. Main circuit 110 includes: a central processing unit (CPU) 111; a communication interface (I/F) portion 112; a read only memory (ROM) 113; a random access memory (RAM) 114; a hard disk drive (HDD) 115 as a mass storage; a facsimile portion 116; and an external storage device 117. CPU 111 is connected with automatic document feeder 120, document reading portion 130, image forming portion 140, paper feeding portion 150, and operation panel 160, and is responsible for overall control of MFP 100.

ROM 113 stores a program to be executed by CPU 111 or data necessary for execution of the program. RAM 114 is used as a work area when CPU 111 executes a program. Further, RAM 114 temporarily stores read images continuously transmitted from document reading portion 130.

Facsimile portion 116 is connected to public switched telephone networks (PSTN), and transmits facsimile data to or receives facsimile data from the PSTN. Facsimile portion 116 stores the received facsimile data in HDD 115. Alternatively, facsimile portion 116 converts the data into print data which can be printed in image forming portion 140, and outputs the print data to image forming portion 140, thereby causing image forming portion 140 to form an image on a sheet of paper on the basis of the facsimile data received by facsimile portion 116. Further, facsimile portion 116 converts the data read by document reading portion 130 or the data stored in HDD 115 into facsimile data, and transmits the facsimile data to a facsimile machine connected to the PSTN.

Communication I/F portion 112 is an interface for connecting MFP 100 to a network. Communication I/F portion 112 communicates with another computer connected to the network, using a communication protocol such as the transmission control protocol (TCP) or the file transfer protocol (FTP). It is noted that the protocol for communication is not particularly limited; any protocol can be used. The network to which communication I/F portion 112 is connected is, for example, a local area network (LAN). It may be connected in a wired or wireless manner. The network is not necessarily the LAN; it may be a wide area network (WAN), a network using the public switched telephone networks (PSTN), or the like. Furthermore, the network is connected to the Internet, so that it is possible for MFP 100 to communicate with a computer, such as a server, connected to the Internet.

External storage device 117, which is controlled by CPU 111, is mounted with a compact disc read-only memory (CD-ROM) 118 or a semiconductor memory. CPU 111 is capable of accessing CD-ROM 118 or the semiconductor memory via external storage device 117. CPU 111 loads the program recorded on CD-ROM 118 or the semiconductor memory mounted on external storage device 117, into RAM 114 for execution. It is noted that the program executed by CPU 111 is not restricted to the program recorded on CD-ROM 118 or the semiconductor memory. CPU 111 may load a program stored in HDD 115, into RAM 114 for execution. In this case, via the network to which communication I/F portion 112 is connected, another computer connected to the network may rewrite the program stored in HDD 115 of MFP 100, or additionally write a new program therein. Further, MFP 100 may download a program from another computer connected to the network, and store the program in HDD 115. As used herein, the "program" includes, not only the program which CPU 111 can execute directly, but also a source program, a compressed program, an encrypted program, and so on.

It is noted that the medium for storing a program executed by CPU 111 is not restricted to CD-ROM 118. It may be an optical disc (magneto-optical (MO) disc, mini disc (MD), digital versatile disc (DVD)), an IC card, an optical card, or a semiconductor memory such as a mask ROM, an erasable programmable ROM (EPROM), an electrically erasable and programmable ROM (EEPROM), or the like.

Operation panel 160 includes display portion 161 and an operation portion 163. Display portion 161 is a display such as a liquid crystal display (LCD) or an organic electro-luminescence display (ELD), and displays an instruction menu for a user, information about acquired image data, and so on. Operation portion 163 includes touch panel 165 and hard key portion 167 made up of a plurality of hard keys. The hard keys included in hard key portion 167 each include a contact switch, which is connected to CPU 111. Each hard key, when depressed by an operation user, closes its contact to close a circuit connected to CPU 111. Each hard key closes the circuit while being depressed by an operation user who operates MFP 100, whereas it opens the circuit while not being depressed by the operation user.

When a plurality of keys included in hard key portion 167 are depressed, operation portion 163 accepts input data, such as instructions, characters, and numerical characters, corresponding to the depressed keys. Touch panel 165 is disposed on an upper or lower surface of display portion 161, and outputs the coordinates of a position designated by the operation user to CPU 111. Touch panel 165 detects the position designated by the operation user with his/her finger or a stylus pen, and outputs the coordinates of the detected position to CPU 111. Touch panel 165 is a multi-touch-capable touch panel. When a user inputs a multi-touch operation, touch panel 165 outputs to CPU 111 a plurality of sets of coordinates corresponding respectively to the plurality of positions designated simultaneously by the user. When a user inputs a single-touch operation, touch panel 165 outputs to CPU 111 a set of coordinates corresponding to the single position designated by the user.

Touch panel 165 preferably has a size equal to or greater than that of the display surface of display portion 161. As touch panel 165 is disposed on the surface of display portion 161, when the operation user designates a position on the display surface of display portion 161, touch panel 165 outputs the coordinates of the position that the operation user has designated on the display surface of display portion 161, to CPU 111. Touch panel 165 may be, for example, of a resistive type, a surface acoustic wave type, an infrared ray type, an electromagnetic induction type, or a capacitance type, although it is not limited to these types. The operations that can be accepted by operation portion 163 include an operation of depressing any of the keys included in hard key portion 167, and a single-touch operation and a multi-touch operation of designating position(s) on touch panel 165.

FIG. 4 shows an example of the software architecture of the CPU included in the MFP. Referring to FIG. 4, in CPU 111, an operating system (OS) layer is formed as the bottom layer, and an MFP process layer is formed above the OS layer. Above the MFP process layer, an application platform (PF) layer is formed, and an application layer is formed above the application PF layer.

A task for CPU 111 to execute an OS program belongs to the OS layer. The task belonging to the OS layer performs the process of controlling hardware resources of MFP 100. Here, the hardware resources include communication I/F portion 112, ROM 113, RAM 114, HDD 115, facsimile portion 116, external storage device 117, automatic document feeder 120, document reading portion 130, image forming portion 140, paper feeding portion 150, and operation panel 160. The task belonging to the OS layer controls the hardware resources in accordance with an operating command input from the MFP process layer. Further, the OS layer shares, with the MFP process layer, a plurality of pieces of operation identification information for respectively identifying a plurality of types of operations that can be accepted by operation portion 163 which is one of the hardware resources. When operation portion 163 detects an operation performed by an operation user, the task belonging to the OS layer outputs a piece of operation identification information for identifying the detected operation, to the MFP process layer.

A task for CPU 111 to execute an application program belongs to the application layer. In the case where two or more application programs are installed into MFP 100, two or more tasks of executing the respective application programs may belong to the application layer.

The task of executing an application program performs a plurality of types of processes determined by the application program. The plurality of types of processes include a process of causing a task belonging to the MFP process layer to perform a process to be performed in the MFP process layer. In the case of causing the task belonging to the MFP process layer to perform a process, the task of executing the application program outputs an application command. The application command is a command which has been released as an application program interface (API). This facilitates creation of an application program for causing MFP 100 to perform a process. Releasing something means that a third party other than the manufacturer of MFP 100 can use it. The third party is able to use the application commands to develop an application program that can be installed into MFP 100.

Further, the task of executing the application program specifies a process to be performed, from among the plurality of types of processes determined by the application program, on the basis of an operation input by the operation user who operates MFP 100. The task of executing the application program then performs the specified process. The operation input by the operation user operating MFP 100 is accepted in the OS layer when the operation user operates operation portion 163 to input the operation.

The application PF layer, located between the application layer and the MFP process layer, has belonging thereto a task of arbitrating a plurality of tasks belonging to the application layer and also controlling the application commands output from the plurality of tasks belonging to the application layer. More specifically, the application PF layer accepts application commands output respectively from the tasks belonging to the application layer, converts the accepted application commands into internal commands in accordance with a predetermined rule, for standardization, and outputs the internal commands to the MFP process layer. This can address the case where a plurality of application programs are different in version, or the like. Further, the application PF layer brings one of the tasks belonging to the application layer into a currently selected state. The application PF layer outputs the operation which has been accepted by the OS layer and is input from the task belonging to the MFP process layer, to the task that has been set to the currently selected state from among the tasks belonging to the application layer.

The operations input by a user and accepted in the OS layer include a single-touch operation, in which the user uses one finger to designate a position on touch panel 165, and a multi-touch operation, in which the user uses two or more fingers to designate positions on touch panel 165 simultaneously. Each of the single-touch operation and the multi-touch operation is detected as a mouse event by the operating system, and is input from the application PF layer to the currently selected task among the tasks belonging to the application layer. Further, one or more mouse events are converted into a gesture event in the MFP process layer, and the gesture event is input from the application PF layer to the currently selected task among the tasks belonging to the application layer. To this end, the application layer shares, with the MFP process layer, one or more gesture events which can be accepted by an application program, and the task of executing the application program receives, from the task belonging to the application PF layer, one or more gesture events acceptable by the application program. The task of executing the application program performs one or more of the plurality of types of processes that correspond(s) to the gesture event(s).

Application commands are associated with internal commands in advance. For example, a commands correspondence table which associates application commands with internal commands may be stored. One application command may correspond to one internal command, or one application command may correspond to a set of two or more internal commands. Further, two or more application commands of different versions may correspond to one internal command or to a set of two or more internal commands. This can address the case where application programs are of different versions. The internal command is a command which depends upon the hardware resource(s) in MFP 100. Internal commands are not released usually, although they may be released.

The MFP process layer, located between the application PF layer and the OS layer, has belonging thereto a task for CPU 111 to execute an MFP process program. The MFP process layer converts an internal command output from a task belonging to the application PF layer, into an operating command which can be interpreted by a task belonging to the OS layer, and outputs the operating command to the task belonging to the OS layer for controlling the hardware resource(s). Although an internal command may actually be converted into one or more operating commands which can be executed by a task belonging to the OS layer, for the convenience sake, it is here assumed that one internal command is converted into one operating command executable by the task belonging to the OS layer.

While the application programs cause MFP 100 to perform a content displaying process of displaying content such as a Web page or image data, a copying process, a scanning process, a printing process, a facsimile transmitting/receiving process, a data transmitting/receiving process, and so on, the following description will focus on the part related to the process of controlling operation panel 160, among the processes the application programs cause CPU 111 to perform.

Figure 5:
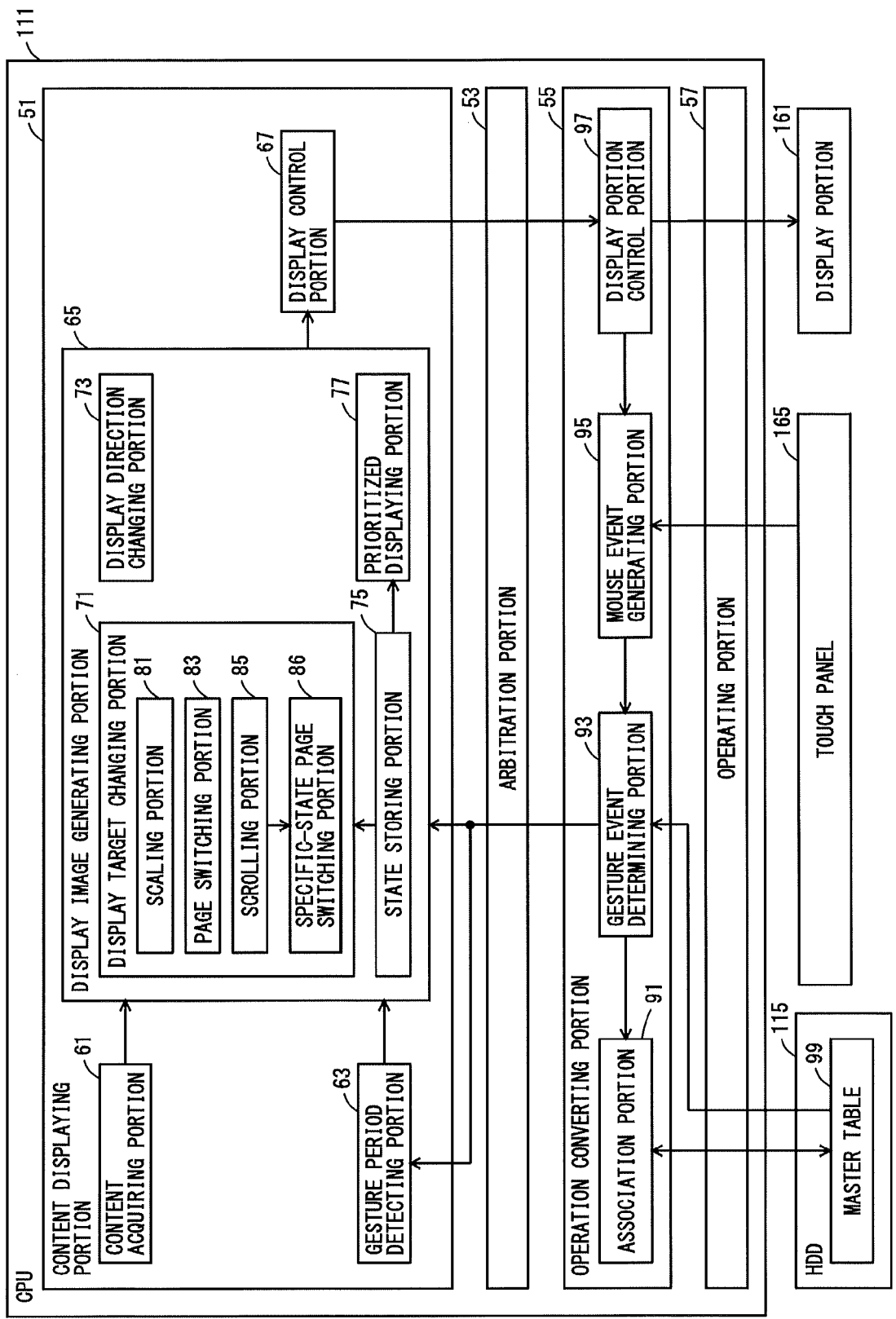
FIG. 5 is a block diagram showing, by way of example, the functions of the CPU included in the MFP, together with information stored in a HDD.

FIG. 5 is a block diagram showing, by way of example, the functions of the CPU included in the MFP, together with information stored in the HDD. The functions shown in FIG. 5 are implemented by CPU 111 included in MFP 100 as CPU 111 executes programs stored in ROM 113, HDD 115, or CD-ROM 118. Specifically, the functions are implemented by CPU 111 as CPU 111 executes an OS program, an MFP process program, an operation accepting program, and an application program. Shown here are the functions of CPU 111 implemented when a content displaying program is installed in MFP 100 as the application program.

Referring to FIG. 5, CPU 111 includes a content displaying portion 51, an arbitration portion 53, an operation converting portion 55, and an operating portion 57. Content displaying portion 51 belongs to the application layer in the software architecture shown in FIG. 4. Content displaying portion 51 is a function formed in CPU 111 as CPU 111 executes the content displaying program.

Arbitration portion 53 and operation converting portion 55 are functions formed in CPU 111 by tasks for CPU 111 to execute the operation accepting program. Arbitration portion 53 belongs to the application PF layer in the software architecture shown in FIG. 4. Operation converting portion 55 also belongs to the application PF layer in the software architecture shown in FIG. 4. While it is here assumed that all the functions of operation converting portion 55 belong to the application PF layer, it may be configured such that at least some of the functions of operation converting portion 55 belong to the application PF layer and the rest belong to the MFP process layer.

In the case where a plurality of tasks are formed in the application layer as CPU 111 executes one or more additional application programs besides content displaying portion 51, arbitration portion 53 brings one of the plurality of tasks into a currently selected state. Hereinafter, the task that has been set in the currently selected state by arbitration portion 53 will be referred to as "current task". In the present embodiment, the application layer includes only content displaying portion 51 for executing the content displaying program. Therefore, arbitration portion 53 brings content displaying portion 51 into the currently selected state.

Arbitration portion 53 receives an application command output from content displaying portion 51, and outputs the application command and application identification information for identifying the task that has output the application command, to operation converting portion 55.

In the case where a plurality of application commands are output from content displaying portion 51, arbitration portion 53 determines the order of the application commands, and sequentially outputs them in the determined order to operation converting portion 55. For example, in the case where a plurality of application commands cannot be executed at the same time, arbitration portion 53 waits until operation converting portion 55 finishes the execution of one application command before arbitration portion 53 outputs another application command to operation converting portion 55. In the case where one application command can be executed only after the execution of another application command is finished, even if the one application command is input earlier than the other application command, arbitration portion 53 outputs the other application command first.

Operation converting portion 55 receives an application command from arbitration portion 53, and converts the application command, in accordance with a commands correspondence table, into an internal command for standardization. The commands correspondence table associates one application command with one or more internal commands. The application commands included in the commands correspondence table may include the application commands of the same type but of different versions. In such a case, each of the application commands of different versions is associated with one or more internal commands. This enables installation of application programs having application commands of different versions described therein. When a new application command appears, the commands correspondence table is updated with a commands correspondence table in which the new application command is associated with one or more internal commands. This enables installation of an application program having the new application command described therein.

Further, operation converting portion 55 converts the standardized internal command into an operating command, and outputs the operating command to operating portion 57. The operating command is a command that has been predetermined between operation converting portion 55 and operating portion 57 and that can be interpreted by operating portion 57.

Operating portion 57 is a function formed in CPU 111 as CPU 111 executes the OS program. Operating portion 57 belongs to the OS layer in the software architecture shown in FIG. 4.

Operating portion 57 receives an operating command output from operation converting portion 55, and controls hardware resources in accordance with the operating command. Here, display portion 161, touch panel 165 in operation portion 163, and HDD 115 will be described as examples of the hardware resources. Operating portion 57 controls display portion 161 to cause it to display an image. Further, operating portion 57 controls HDD 115 to cause it to store data, and also reads data stored in HDD 115. Furthermore, operating portion 57 causes touch panel 165 to detect a position designated by a user, at a prescribed time interval, and acquires positional information from touch panel 165 at a prescribed time interval.

When an operation user designates a position on the display surface of display portion 161, touch panel 165 detects the position designated by the operation user, and outputs the positional information indicating the position on the display surface of display portion 161, to CPU 111. When operating portion 57 receives positional information from touch panel 165, operating portion 57 outputs the positional information to operation converting portion 55. Operating portion 57 may receive two or more pieces of positional information simultaneously from touch panel 165. For example, when an operation user uses two fingers to designate two different positions on the display surface of display portion 161 simultaneously, operating portion 57 accepts two pieces of positional information which respectively indicate the two positions designated on the display surface. When operating portion 57 accepts two or more pieces of positional information simultaneously from touch panel 165, operating portion 57 outputs the two or more pieces of positional information to operation converting portion 55.

Operation converting portion 55 includes an association portion 91, a gesture event determining portion 93, a mouse event generating portion 95, and a display portion control portion 97. At the stage when the content displaying program is installed, association portion 91 associates each of a plurality of types of processes determined by the content displaying program, with one of a plurality of gesture events. Specifically, association portion 91 generates a master table in which a plurality of pieces of process identification information respectively identifying the plurality of processes determined by the content displaying program are associated with corresponding ones of gesture events acceptable by the content displaying program, and stores the generated master table into HDD 115.

FIG. 6 shows an example of a master table. Referring to FIG. 6, the master table 99 includes a master record for each of a plurality of pieces of process identification information. Each master record includes a "process" field and a "gesture" field. In the "process" field, process identification information is set. In the "gesture" field, gesture identification information for identifying a gesture event is set.

For example, the master record with the process identification information "Page Turning" set in the "process" field has the gesture identification information "Swipe" set in the "gesture" field. The process specified by the process identification information "Page Turning" is the process of changing the screen to another page. The gesture event specified by the gesture identification information "Swipe" corresponds to the user operation of moving a finger, while designating a position on touch panel 165, to the left, right, up, or down at a speed equal to or higher than a prescribed speed. As the direction of moving a finger is determined during the operation of moving the finger at a speed equal to or higher than a prescribed speed, the gesture event specified by the gesture identification information "Swipe" includes the direction of moving the finger as a parameter.

The master record with the process identification information "Enlargement" set in the "process" field has the gesture identification information "Pinch Out" set in the "gesture" field. The process specified by the process identification information "Enlargement" is the process of zooming in on the screen. The gesture event specified by the gesture identification information "Pinch Out" corresponds to the user operation of moving at least one of the two locations designated on touch panel 165 such that the spacing between the two locations increases. As the spacing between the two locations is changed during the operation of moving the finger(s) to increase the spacing between the two locations, the gesture event specified by the gesture identification information "Pinch Out" includes a scaling factor indicating the rate of change of the spacing between the two locations, as a parameter.

The master record with the process identification information "Reduction" set in the "process" field has the gesture identification information "Pinch In" set in the "gesture" field. The process specified by the process identification information "Reduction" is the process of zooming out on the screen. The gesture event specified by the gesture identification information "Pinch In" corresponds to the user operation of moving at least one of the two locations designated on touch panel 165 such that the spacing between the two locations decreases. As the spacing between the two locations is changed during the operation of moving the finger(s) to decrease the spacing between the two locations, the gesture event specified by the gesture identification information "Pinch In" includes a scaling factor indicating the rate of change of the spacing between the two locations, as a parameter.

The master record with the process identification information "Rotation" set in the "process" field has the gesture identification information "Rotation" set in the "gesture" field. The process specified by the process identification information "Rotation" is the process of rotating a screen to change the direction of the screen. The gesture event specified by the gesture identification information "Rotation" is detected when the user operation of moving at least one of the two locations designated on touch panel 165 such that the direction of the straight line connecting the two locations is changed is input. For example, a user may input an operation of drawing an arc with one finger about the location designated by the other finger. As the arc can be drawn clockwise or counterclockwise, the gesture event specified by the gesture identification information "Rotation" includes the rotation direction and the rotation angle as parameters.

The master record with the process identification information "Scroll" set in the "process" field has the gesture identification information "Flick" and "Double Flick" set in the "gesture" field. The process specified by the process identification information "Scroll" is the process of scrolling a screen to the left, right, up, or down. The gesture event specified by the gesture identification information "Flick" corresponds to the user operation of moving a finger, while designating a position on touch panel 165, to the left, right, up, or down at a speed lower than the threshold value that is also used for determination of the user operation corresponding to the gesture event identified by the gesture identification information "Swipe". As the direction of moving a finger is determined during the operation of moving the finger at a speed lower than the threshold value, the gesture event specified by the gesture identification information "Flick" includes the direction of moving the finger and the travel distance thereof as parameters. The gesture event specified by the gesture identification information "Double Flick" corresponds to the user operation of, while designating positions with two fingers on touch panel 165, moving the two fingers simultaneously in the same direction to the left, right, up, or down, at a speed lower than the threshold value that is also used for determination of the user operation corresponding to the gesture event identified by the gesture identification information "Swipe". During the operation of moving two fingers simultaneously in the same direction at a speed lower than the threshold value, the direction of moving the fingers is determined. Therefore, the gesture event specified by the gesture identification information "Double Flick" includes the direction of moving the two fingers and the travel distance thereof as parameters.

Returning to FIG. 5, display portion control portion 97 converts the application command input from content displaying portion 51, into an operating command for causing display portion 161 to display an image, and outputs the operating command to operating portion 57. As a result, a display image generated by content displaying portion 51 is stored into a video RAM (VRAM) included in display portion 161, and at least a part of the display image is displayed on display portion 161.

Mouse event generating portion 95 generates a mouse event in response to input of positional information from operating portion 57. Further, each time mouse event generating portion 95 generates a mouse event, it outputs the generated mouse event to gesture event determining portion 93. When mouse event generating portion 95 receives a plurality of pieces of positional information simultaneously from operating portion 57, mouse event generating portion 95 generates a plurality of mouse events corresponding respectively to the pieces of positional information. In the case where mouse event generating portion 95 generates one or more mouse events, it outputs the generated one or more mouse events to gesture event determining portion 93. The positional information indicates the position designated by an operation user on the display surface of display portion 161.

The operations by which an operation user designates a position on the display surface of display portion 161 include: a designation starting operation by which a user designates an arbitrary position on the display surface of display portion 161; a move operation by which the user moves the designated position while designating (or, touching) the display surface of display portion 161; and an exit operation by which the user terminates the designation performed on the display surface of display portion 161. When mouse event generating portion 95 receives positional information from operating portion 57, mouse event generating portion 95 determines whether the operation performed by the operation user is the designation starting operation, the move operation, or the exit operation. As stated above, each time the positional information is output from touch panel 165, operating portion 57 outputs the positional information. Therefore, mouse event generating portion 95 determines whether the operation performed by the operation user is the designation starting operation, the move operation, or the exit operation, on the basis of the continuity of the pieces of positional information which are input continuously over time.

When positional information is received from operating portion 57 after no positional information has been received therefrom for a prescribed period of time, mouse event generating portion 95 determines, for the received positional information, that the operation user has performed the designation starting operation. Then, mouse event generating portion 95 generates a mouse event including the positional information and state identification information "Press" for identifying the designation starting operation.

Following the detection of the mouse event whose state identification information is "Press", when one or more pieces of positional information are input continuously from operating portion 57, mouse event generating portion 95 determines, for each of the received pieces of positional information, that the operation user has performed the move operation. Then, for each of the one or more pieces of positional information input continuously from operating portion 57, mouse event generating portion 95 generates a mouse event including the positional information and state identification information "Move" for identifying the move operation.

Following the detection of the mouse event whose state identification information is "Move", when positional information is no longer input from operating portion 57, mouse event generating portion 95 determines, for the lastly received positional information, that the operation user has performed the exit operation. Then, mouse event generating portion 95 generates a mouse event including the lastly received positional information and state identification information "Release" for identifying the exit operation.

More specifically, mouse event generating portion 95 determines the state of a mouse event on the basis of the positional information that is input from operating portion 57 at a first time and the positional information that is input from operating portion 57 at a second time which is a prescribed time after the first time. In the case where positional information is input at the first time but no positional information indicating a position within the range of a prescribed distance from the position specified by the positional information input at the first time was input a prescribed time before the first time, then mouse event generating portion 95 determines the state of the mouse event for the positional information input at the first time to be "Press". In the case where the position specified by the positional information input at the first time does not fall within the range of a prescribed distance from the position specified by the positional information input at the second time, then mouse event generating portion 95 determines the state of the mouse event for the positional information input at the second time to be "Press".

Further, in the case where the position specified by the positional information input at the first time falls within the range of a prescribed distance from the position specified by the positional information input at the second time, then mouse event generating portion 95 determines the state of the mouse event for the positional information input at the second time to be "Move". Further, in the case where no positional information indicating a position within the range of a prescribed distance from the position specified by the positional information input at the first time is input at the second time, then mouse event generating portion 95 determines, at the second time, the state of the mouse event for the positional information that was input at the first time to be "Release".

Gesture event determining portion 93 determines a gesture event on the basis of a plurality of mouse events continuously input from mouse event generating portion 95. In the case where mouse events are continuously input one at a time from mouse event generating portion 95, gesture event determining portion 93 specifies a second mouse event which is input a prescribed time after the first mouse event was input. Then, in the case where the distance between the position specified by the first mouse event and the position specified by the second mouse event is equal to or greater than a prescribed distance, gesture event determining portion 93 determines a gesture event, whereas when the distance between the two positions is smaller than the prescribed distance, gesture event determining portion 93 refrains from determining a gesture event. The prescribed time may be determined arbitrarily. For example, the prescribed time can be set to several times the interval of detection of positions by touch panel 165. The prescribed distance may also be determined arbitrarily, although it is preferably set to 40 pixels, for example.

In the case where two or more mouse events are simultaneously input from mouse event generating portion 95, gesture event determining portion 93 determines a gesture event on the basis of the two or more mouse events. Therefore, when a user inputs a multi-touch operation, gesture event determining portion 93 determines a gesture event. Specifically, in the case where a first mouse event and a second mouse event are input simultaneously from mouse event generating portion 95, gesture event determining portion 93 determines a gesture event on the basis of a first set of a plurality of mouse events which are continuously input in relation to the first mouse event, and a second set of a plurality of mouse events which are continuously input in relation to the second mouse event. The mouse events included in the first set have their positional information identical to or continuous with one another. Here, being "continuous" means that two pieces of positional information indicate positions which are located within a prescribed distance from each other. The mouse events included in the second set have their positional information identical to or continuous with one another. Therefore, gesture event determining portion 93 refers to the positional information included in each of the simultaneously input mouse events, to determine whether the mouse event belongs to the first set or the second set.

In the case where mouse events are continuously input from mouse event generating portion 95 to gesture event determining portion 93, the state identification information of the firstly input mouse event is "Press". Then, when a mouse event whose state identification information is "Move" is input, gesture event determining portion 93 calculates a distance between the two points, on the basis of the positional information included in the mouse event whose state identification information is "Press" and the positional information included in the mouse event whose state identification information is "Move", and calculates a speed of designation (hereinafter, "designation speed") on the basis of the calculated distance and the time elapsed from when the mouse event with the state identification information "Press" was detected to when the mouse event with the state identification information "Move" was detected. Gesture event determining portion 93 detects a user's swipe operation if the designation speed is a prescribed threshold value TV or greater, while it detects a user's flick operation if the designation speed is smaller than the threshold value TV. When a plurality of mouse events are input, a user's flick operation may be detected by earlier mouse events and a user's swipe operation may be detected by later mouse events. When gesture event determining portion 93 detects a flick operation or a swipe operation, it calculates a direction from the position specified by the positional information included in the preceding mouse event toward the position specified by the positional information included in the succeeding mouse event, determines one of the left, right, top, and down directions relative to the display surface of display portion 161 that is closest to the calculated direction, as a designated direction, and determines a gesture event including the designated direction as a parameter. When gesture event determining portion 93 detects a swipe operation, it determines a gesture event which includes the gesture identification information "Swipe" and a parameter indicating the designated direction. When gesture event determining portion 93 detects a flick operation, it determines a gesture event which includes the gesture identification information "Flick", a parameter indicating the designated direction, and a parameter indicating the travel distance. The travel distance is the distance between the two points, which is calculated on the basis of the positional information included in the mouse event whose state identification information is "Press" and the positional information included in the mouse event whose state identification information is "Move".

In the case where gesture event determining portion 93 receives two mouse events simultaneously from mouse event generating portion 95, the state of each of the firstly input two mouse events is "Press". In this case, gesture event determining portion 93 calculates, on the basis of the positional information included in the respective mouse events, a distance L1 between the two points and an angle R1 of a straight line connecting the two points. The angle of the straight line connecting the two points may be an angle between the straight line and a reference line extending in a lateral direction of display portion 161. The angle between the reference line and the straight line connecting the two points is calculated clockwise from the reference line. Then, as two mouse events are subsequently input simultaneously, gesture event determining portion 93 calculates, on the basis of the positional information included in the subsequently input two mouse events, a distance L2 between the two points and an angle R2 of a straight line connecting the two points.

In the case where the distance L2 is different from the distance L1, then gesture event determining portion 93 detects a pinch-out operation or a pinch-in operation by a user. If the distance L2 is greater than the distance L1, gesture event determining portion 93 detects a pinch-out operation. If the distance L2 is smaller than the distance L1, gesture event determining portion 93 detects a pinch-in operation. When detecting a pinch-out or pinch-in operation, gesture event determining portion 93 calculates a scaling factor by dividing the distance L2 by the distance L1, determines the calculated scaling factor as a parameter, and determines a gesture event including the parameter indicating the scaling factor. When gesture event determining portion 93 detects a pinch-out operation, it determines a gesture event including the gesture identification information "Pinch Out" and a parameter indicating the scaling factor. When gesture event determining portion 93 detects a pinch-in operation, it determines a gesture event including the gesture identification information "Pinch In" and a parameter indicating the scaling factor.

In the case where the difference between the angle R1 and the angle R2 is a prescribed threshold value TR or greater, gesture event determining portion 93 detects a rotation operation by a user. The threshold value TR is a predetermined value, which is preferably set to 90 degrees or less, for example. When detecting a rotation operation, gesture event determining portion 93 determines the rotation angle and rotation direction by subtracting the angle R1 from the angle R2, and determines the determined rotation angle and rotation direction as parameters. If the value obtained by subtracting the angle R1 from the angle R2 is positive, the rotation direction is clockwise. If the value is negative, the rotation direction is counterclockwise. When gesture event determining portion 93 detects a rotation operation, it determines a gesture event including the gesture identification information "Rotation", a parameter indicating the rotation angle, and a parameter indicating the rotation direction.

In the case where first and second mouse events having the state identification information "Move" are simultaneously input, gesture event determining portion 93 calculates a first moving direction on the basis of the positional information of the first mouse event and the positional information of the mouse event having the state identification information "Press" corresponding to the first mouse event, and also calculates a second moving direction on the basis of the positional information of the second mouse event and the positional information of the mouse event having the state identification information "Press" corresponding to the second mouse event. More specifically, the direction from the position specified by the positional information of the mouse event whose state identification information is "Press" toward the position specified by the positional information of the mouse event whose state identification information is "Move" is calculated as the moving direction. Then, if the moving directions corresponding respectively to the first and second mouse events are the same, gesture event determining portion 93 detects a double flick operation by a user. It may be determined that the directions corresponding respectively to the first and second mouse events are the same in the case where the difference between the moving directions corresponding respectively to the first and second mouse events is within a prescribed range. When gesture event determining portion 93 detects a double flick operation, it determines a gesture event including the gesture identification information "Double Flick", a parameter indicating the designated direction corresponding to the moving direction, and a parameter indicating the travel distance. The travel distance may be a distance between the position specified by the positional information of the first mouse event and the position specified by the positional information of the mouse event having the state identification information "Press" corresponding to the first mouse event.

As such, in the case where two sets of mouse events are input simultaneously, gesture event determining portion 93 may determine a plurality of types of gesture events. They may be a set of the gesture event having the gesture identification information "Pinch Out" and the gesture event having the gesture identification information "Rotation"; a set of the gesture event having the gesture identification information "Pinch In" and the gesture event having the gesture identification information "Rotation"; a set of the gesture event having the gesture identification information "Pinch Out" and the gesture event having the gesture identification information "Double Flick"; and a set of the gesture event having the gesture identification information "Pinch In" and the gesture event having the gesture identification information "Double Flick".

When gesture event determining portion 93 determines a gesture event, gesture event determining portion 93 reads, from HDD 115, master table 99 corresponding to the application identification information of the current task which has been set by arbitration portion 53. Specifically, gesture event determining portion 93 outputs an operating command instructing to read master table 99 to operating portion 57, and acquires master table 99 that operating portion 57 reads by controlling HDD 115. In the following description, it is assumed that content displaying portion 51 is the current task.

Once gesture event determining portion 93 determines a gesture event, it specifies, from among a plurality of types of processes determined in master table 99, a process that is associated with the determined gesture event in correspondence with the current task being set in the currently selected state by arbitration portion 53. Here, as content displaying portion 51 has been set as the current task by arbitration portion 53, gesture event determining portion 93 specifies the process that is associated with the gesture event by the master table 99 shown in FIG. 6. More specifically, gesture event determining portion 93 extracts, from master table 99, a master record in which the gesture identification information included in the determined gesture event is set in the "gesture" field, and acquires the process identification information that is set in the "process" field in the extracted master record. When the process identification information is acquired, gesture event determining portion 93 outputs the determined gesture event to arbitration portion 53. When no process identification information is acquired, gesture event determining portion 93 refrains from outputting the determined gesture event to arbitration portion 53. Further, in the case where gesture event determining portion 93 determines a plurality of gesture events, it outputs any of the gesture events for which a process is specified, to arbitration portion 53. The gesture event output from gesture event determining portion 93 includes gesture identification information for identifying the gesture event. In the case where gesture event determining portion 93 continuously receives mouse events from mouse event generating portion 95 but determines no gesture event, gesture event determining portion 93 outputs a non-determination signal indicating that no gesture event is determined, to arbitration portion 53.

Gesture event determining portion 93 outputs, to arbitration portion 53, only the gesture event corresponding to the process that can be executed by content displaying portion 51 which is the current task being set in the currently selected state by arbitration portion 53. Arbitration portion 53 outputs the gesture event to content displaying portion 51 which is the current task. It is thus possible to cause content displaying portion 51, which executes the content displaying program, to perform the process corresponding to the gesture event which is the operation input to touch panel 165 and specified by a set of mouse events. In other words, at the stage of program development, a content displaying program can be developed without any concern for the gesture events which can be accepted by touch panel 165 in MFP 100. For example, it is possible to develop a content displaying program which accepts no rotation operation.

Arbitration portion 53 receives a gesture event from gesture event determining portion 93, and outputs the gesture event to content displaying portion 51 which has been set in the currently selected state. Arbitration portion 53 outputs a gesture event to content displaying portion 51 in response to reception of the gesture event from gesture event determining portion 93. It is noted that in the case where a plurality of tasks are formed in the application layer as CPU 111 executes one or more additional application programs besides content displaying portion 51, arbitration portion 53 outputs the gesture event received from gesture event determining portion 93, to one of the plurality of tasks which has been set in the currently selected state.

Content displaying portion 51 includes a content acquiring portion 61, a gesture period detecting portion 63, a display image generating portion 65, and a display control portion 67.

Content acquiring portion 61 acquires content and outputs the acquired content to display image generating portion 65. The content includes data stored in an external server and data stored in HDD 115. The data type is not restricted. For example, in the case where the content is a Web page described in a markup language such as hypertext markup language (HTML) and stored in an external Web server, content acquiring portion 61 controls communication I/F portion 112 to receive the Web page from the Web server, thereby acquiring the Web page. In the case where there is other content linked to the Web page, content acquiring portion 61 acquires the other content as well. The content acquired by content acquiring portion 61 may be a Web page identified by the uniform resource locator (URL) designated by an operation user who operates MFP 100, or a Web page identified by the URL predetermined in the content displaying program. In the case where the content is application data or image data stored in HDD 115, content acquiring portion 61 reads the application data or the image data from HDD 115, thereby acquiring the content.

Gesture period detecting portion 63 receives a gesture event from gesture event determining portion 93. Gesture period detecting portion 63 detects a gesture period on the basis of the gesture events input from gesture event determining portion 93. While detecting the gesture period, gesture period detecting portion 63 outputs a gesture period signal indicating that the gesture period is ongoing, to display image generating portion 65. The gesture period is a period during which gesture events are continuously determined by gesture event determining portion 93. The gesture event(s) input from gesture event determining portion 93 include(s) at least one gesture event having gesture identification information "Swipe", "Flick", "Pinch Out", "Pinch In", "Rotation", "Double Flick", or "Double Tap".

Specifically, gesture event determining portion 93 determines a gesture event on the basis of one or more mouse events. After a gesture event has been determined by gesture event determining portion 93, however, mouse events may be continuously generated by mouse event generating portion 95. For example, in the case where a user inputs a pinch-in operation, a gesture event is determined by gesture event determining portion 93 while the user is moving two fingers. In this case, mouse events having the state identification information "Move" are generated by mouse event generating portion 95 until the user moves the fingers away from touch panel 165, and once the user releases the fingers from touch panel 165, a mouse event having the state identification information "Release" is generated by mouse event generating portion 95. After gesture event determining portion 93 determines a gesture event having the gesture identification information "Pinch In", gesture event determining portion 93 outputs the gesture event with the gesture identification information "Pinch In" each time the mouse event having the state identification information "Move" is input, until a mouse event having the state identification information "Release" is input from mouse event generating portion 95. Gesture period detecting portion 63 detects the gesture period as long as the same gesture events are continuously input from gesture event determining portion 93.

Further, in the case where a user inputs a rotation operation, a gesture event having the gesture identification information "Rotation" is determined by gesture event determining portion 93 while the user is moving the two fingers. The spacing between the two fingers, however, may be changed during the rotation operation. For example, in the case where the spacing between the fingers is decreased, a gesture event having the gesture identification information "Pinch In" is determined by gesture event determining portion 93. In the case where gesture event determining portion 93 determines two gesture events after the start of the gesture period, gesture event determining portion 93 outputs the two gesture events. In this case as well, when a first gesture event is input from gesture event determining portion 93, gesture period detecting portion 63 detects the start of the gesture period, and when a gesture event is no longer input from gesture event determining portion 93, gesture period detecting portion 63 detects the termination of the gesture period.

Display image generating portion 65 receives content from content acquiring portion 61, a gesture period signal from gesture period detecting portion 63, and one or more gesture events from gesture event determining portion 93. Display image generating portion 65 generates a display image for displaying the content, on the basis of the one or more gesture events input from gesture event determining portion 93. In the case where the content is composed of a plurality of pages, display image generating portion 65 generates, as a display image, an image of at least a part of the page to be displayed among the plurality of pages. In other words, the display image generated by display image generating portion 65 includes an image of a part or a whole of a single page; it does not include an image of a plurality of pages. Display image generating portion 65 includes a display target changing portion 71, a display direction changing portion 73, a state storing portion 75, and a prioritized displaying portion 77.

When display image generating portion 65 receives content from content acquiring portion 61, display image generating portion 65 determines at least a part of the content as a display area, and generates a display image for displaying the display area. The display area to be determined by display image generating portion 65 at the time when content is input from content acquiring portion 61 may be predetermined. For example, the entire content may be set as a default display area. In the case where content is made up of a plurality of pages, the entirety of the first page may be set as a default display area.

State storing portion 75 temporarily stores, into RAM 114, state information for specifying the display area at a gesture period start time at which the gesture period is started. The state information includes the position and size (scaling factor) of the display area within the content. In the case where content includes a plurality of pages, the state information also includes the page number for specifying a page.

Display target changing portion 71 changes a display area in the case where a gesture event of a first type is input from gesture event determining portion 93, and generates a display image for displaying the changed display area. The gesture events of the first type include the gesture events each having one of the gesture identification information "Pinch In", "Pinch Out", "Swipe", "Flick", and "Double Flick". Display target changing portion 71 includes a scaling portion 81, a page switching portion 83, a scrolling portion 85, and a specific-state page switching portion 86.

Scaling portion 81 changes the size of the display area in the case where a gesture event having the gesture identification information "Pinch In" or "Pinch Out" is input from gesture event determining portion 93. The gesture event having the gesture identification information "Pinch In" or "Pinch Out" includes the scaling factor as the parameter. Scaling portion 81 changes the size of the display area by the scaling factor included as the parameter in the gesture event having the gesture identification information "Pinch In" or "Pinch Out".

In the case where content includes a plurality of pages and when a gesture event having the gesture identification information "Swipe" is input from gesture event determining portion 93, page switching portion 83 determines the page preceding or succeeding the page to which the display area belongs, as a page to which a new display area belongs. In the case where the page to which the display area belongs is the first (front) page of the content, the page preceding the page to which the display area belongs is the last page of the content. In the case where the page to which the display area belongs is the last page of the content, the page succeeding the page to which the display area belongs is the first (front) page of the content. Page switching portion 83 uses the state information to specify the page to which the display area belongs. The gesture event having the gesture identification information "Swipe" includes the designated direction as the parameter. Page switching portion 83 determines the page which is determined by the designated direction included as the parameter in the gesture event with the gesture identification information "Swipe". Here, it is assumed, by way of example, that the content includes a first page to an Nth page (where N is an integer of 2 or more), and that the display area is included in the Mth page (where M is an integer of not less than 1 and not more than N). In the case where the designated direction included in the gesture event with the gesture identification information "Swipe" indicates "up" or "left", page switching portion 83 determines the (M−1)th page as the page to which a new display area belongs. In the case where the designated direction included in the gesture event with the gesture identification information "Swipe" indicates "down" or "right", page switching portion 83 determines the (M+1)th page as the page to which a new display area belongs.

In the case where a gesture event having the gesture identification information "Flick" or "Double Flick" is input from gesture event determining portion 93, scrolling portion 85 moves the display area within the content. The gesture event having the gesture identification information "Flick" or "Double Flick" includes a parameter indicating the direction and a parameter indicating the travel distance. Scrolling portion 85 translates the display area in the direction included as the parameter in the gesture event with the gesture identification information "Flick" or "Double Flick", by the travel distance included as the parameter therein. In the case where the display area is located at the end of the content or the like, the distance by which the display area can be moved may be shorter than the travel distance determined by the parameter. In such a case, scrolling portion 85 moves the display area as much as possible in the direction included as the parameter, and outputs a specific-state signal indicating that it was not possible to move the display area by the travel distance, to specific-state page switching portion 86. The specific-state signal includes the designated direction that is included as the parameter in the gesture event with the gesture identification information "Flick" or "Double Flick".

In the case where content includes a plurality of pages, when a specific-state signal is input from scrolling portion 85 during the gesture period, specific-state page switching portion 86 determines, at a gesture period termination time at which the gesture period is terminated, a page preceding or succeeding the page to which the display area belongs, as the page to which a new display area belongs. When the state where gesture period signals have been input from gesture period detecting portion 63 is changed to the state where a gesture period signal is no longer input therefrom, the gesture period termination time is detected. Specific-state page switching portion 86 uses the state information to specify the page to which the display area belongs. Specific-state page switching portion 86 then determines the page that is determined by the designated direction included in the specific-state signal. More specifically, in the case where the direction included in the specific-state signal indicates "up" or "left", specific-state page switching portion 86 determines the page preceding the page to which the display area belongs, as the page to which a new display area belongs. In the case where the direction included in the specific-state signal indicates "down" or "right", specific-state page switching portion 86 determines the page succeeding the page to which the display area belongs, as the page to which a new display area belongs.

In the case where a gesture event having the gesture identification information "Rotation" is input from gesture event determining portion 93, display direction changing portion 73 changes the direction of the display area. The gesture event having the gesture identification information "Rotation" includes a parameter indicating the rotation angle and a parameter indicating the rotation direction. Display direction changing portion 73 changes the direction of the display area by turning the display area by the rotation angle in the rotation direction that are included as the parameters in the gesture event having the gesture identification information "Rotation".

In the case where a gesture event of the first type and a gesture event of the second type are input from gesture event determining portion 93 during the gesture period, prioritized displaying portion 77 changes the display area specified by the state information, on the basis of the gesture event of the second type. The gesture events of the first type include the gesture events having the gesture identification information "Pinch In", "Pinch Out", "Swipe", "Flick", and "Double Flick". The gesture event of the second type is the gesture event having the gesture identification information "Rotation". Prioritized displaying portion 77 changes the direction of the display area determined by the state information. Specifically, prioritized displaying portion 77 changes the direction of the display area by turning the display area by the rotation angle in the rotation direction that are included as the parameters in the gesture event having the gesture identification information "Rotation" that is lastly input from gesture event determining portion 93 during the gesture period.

<During the Gesture Period>

During the gesture period, in the case where a page is switched by page switching portion 83, display image generating portion 65 sets the changed page as a processing target. In the case where a page is not switched by page switching portion 83, display image generating portion 65 sets the page specified by the state information as a processing target. In the case where the display area is changed by scaling portion 81 and/or scrolling portion 85, display image generating portion 65 generates a display image for displaying the changed display area within the processing target page. In the case where the direction of the display area is changed by display direction changing portion 73, display image generating portion 65 generates a display image for displaying the display area within the processing target page, with the direction changed. Further, in the case where the display area is changed by scaling portion 81 and/or scrolling portion 85 and in the case where the direction of the display area is changed by display direction changing portion 73, display image generating portion 65 generates a display image for displaying the changed display area within the processing target page, with the direction changed.

<At the Gesture Period Termination Time>

In the case where a page is switched by specific-state page switching portion 86 at the gesture period termination time at which the gesture period is terminated, display image generating portion 65 sets the changed page as the processing target, and generates a display image for displaying a display area. The display area may be a predetermined area within the page. Alternatively, the position and size, within the page, of the display area that has been determined at the gesture period termination time may be used.

In the case where the direction of the display area is changed by prioritized displaying portion 77 at the gesture period termination time at which the gesture period is terminated, display image generating portion 65 generates a display image for displaying the display area within the processing target page, with its direction changed.

When display control portion 67 receives a display image from display image generating portion 65, display control portion 67 displays the display image on display portion 161. Specifically, display control portion 67 outputs an application command to arbitration portion 53, in order to display the display image on display portion 161. This causes operating portion 57 to store the display image into the VRAM included in display portion 161, and display the display image on display portion 161.

Figure 7:
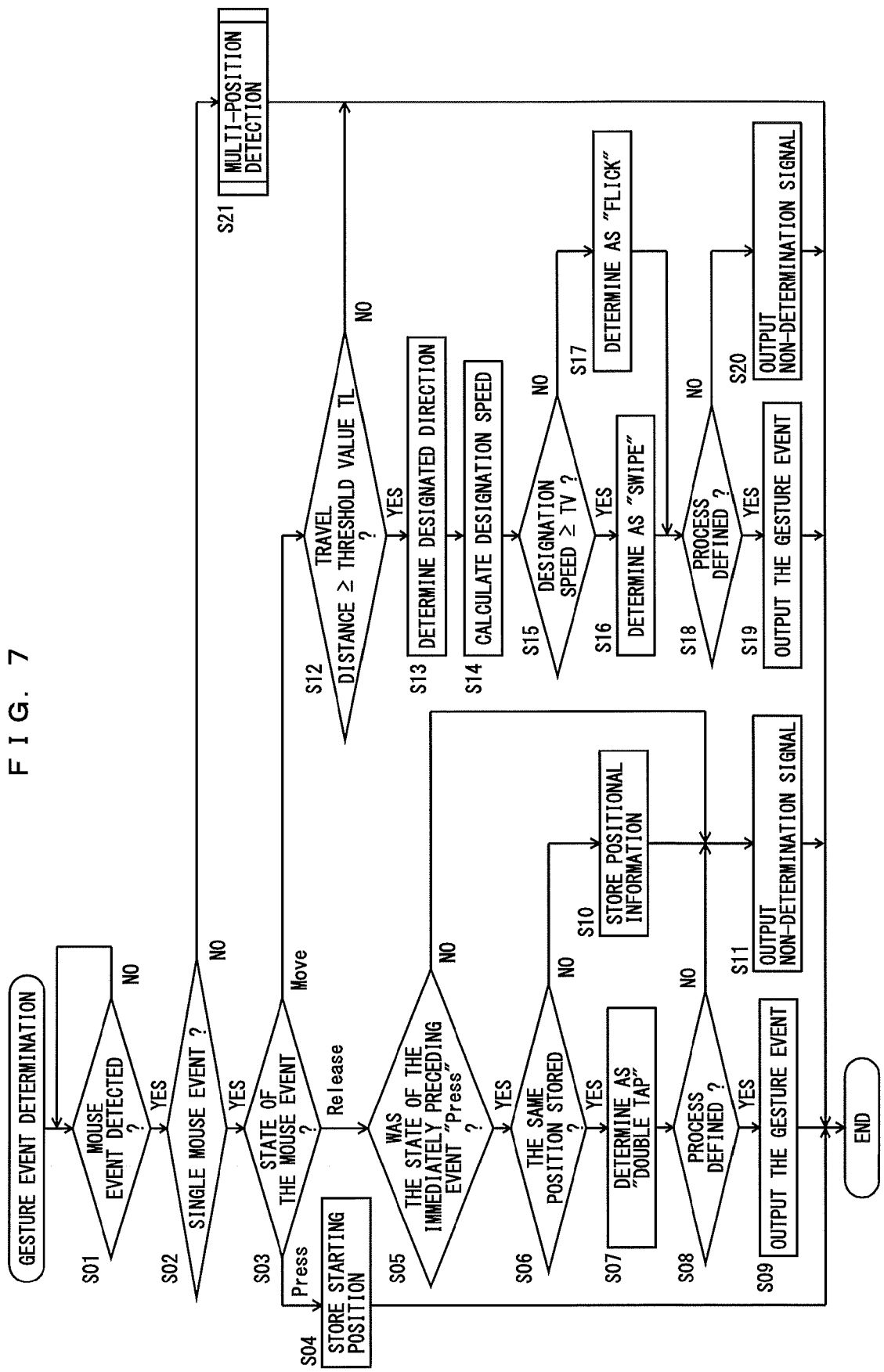
FIG. 7 is a flowchart illustrating an example of the flow of a gesture event determining process.

FIG. 7 is a flowchart illustrating an example of the flow of a gesture event determining process. The gesture event determining process is carried out by CPU 111 included in MFP 100 as CPU 111 executes an operation accepting program stored in ROM 113, HDD 115, or CD-ROM 118. Referring to FIG. 7, CPU 111 determines whether a mouse event has been detected (step S01). If a user designates a position on touch panel 165, a mouse event is detected on the basis of the position detected by touch panel 165. CPU 111 is in a standby mode until a mouse event is detected (NO in step S01), and once a mouse event is detected (YES in step S01), the process proceeds to step S02. In other words, the gesture event determining process is executed on the condition that a user has designated touch panel 165 and, thus, a mouse event has been detected.

In step S02, CPU 111 determines whether a single mouse event has been detected. If a single mouse event has been detected, the process proceeds to step S03. If more than one mouse event has been detected, the process proceeds to step S21. In step S21, CPU 111 performs a multi-position detecting process, and the process is terminated. The multi-position detecting process will be described in detail later.

In step S03, the process branches in accordance with the state of the mouse event. If the state of the mouse event is "Press", the process proceeds to step S04. If the state of the mouse event is "Release", the process proceeds to step S05. If the state of the mouse event is "Move", the process proceeds to step S12. In step S04, CPU 111 stores positional information included in the mouse event which has been detected in step S01, as a starting position, into RAM 114, and the process is terminated.

The process proceeds to step S05 when the state of the mouse event detected in step S01 is "Release", in which case another mouse event has been input immediately before the mouse event. The state of the other mouse event may be "Press" or "Move". In step S05, the process branches in accordance with the state of the other mouse event input immediately before. If the state of the other mouse event input immediately before is "Press", the process proceeds to step S06; otherwise, the process proceeds to step S11. In step S11, CPU 111 outputs a non-determination signal, and the process is terminated.

In step S06, CPU 111 determines whether RAM 114 stores the same positional information as the one included in the mouse event detected in step S01. If so, the process proceeds to step S07; otherwise, the process proceeds to step S10. Here, the determination that the pieces of positional information are the same means that the distance between the two positions specified by the respective pieces of positional information is within a prescribed length. A certain margin of error is set for detecting the user operations of designating the same position.

In step S07, CPU 111 determines the gesture event to be "Double Tap", and the process proceeds to step S08. The process proceeds to step S07 when the state of the mouse event input immediately before is "Press" and the state of the mouse event input in step S01 is "Release" and when the same positional information has been stored in RAM 114. In other words, the process proceeds to step S07 when the user, following the first tap operation, taps the same position as the firstly tapped position.

In step S08, CPU 111 determines whether a process corresponding to the determined gesture event has been defined. Specifically, CPU 111 determines whether the plurality of types of processes that have been determined in master table 99 stored in HDD 115 include a process that is associated with the relevant gesture event in correspondence with the application program being set in the currently selected state. If there is a process associated with the determined gesture event in master table 99, CPU 111 determines that a process corresponding to the determined gesture event has been defined for the application program set in the currently selected state. If a process corresponding to the determined gesture event has been defined, the process proceeds to step S09; otherwise, the process proceeds to step S11. In step S09, CPU 111 outputs the gesture event including the gesture identification information "Double Tap", which has been determined in step S07, and the process is terminated. In step S11, CPU 111 outputs a non-determination signal, and the process is terminated.

The process proceeds to step S10 when the state of the mouse event input immediately before is "Press" and the state of the mouse event input subsequently is "Release" and when the same positional information has not been stored in RAM 114. In other words, the process proceeds to step S10 when a user inputs a first tap operation. In step S10, CPU 111 stores the positional information included in the mouse event which has been detected in step S01, as a starting position, into RAM 114, and the process proceeds to step S11. In step S11, CPU 111 outputs a non-determination signal, and the process is terminated.

The process proceeds to step S12 when the state of the mouse event is "Move". This means that another mouse event has been input immediately before the mouse event. The state of the other mouse event may be "Press" or "Move". In step S12, CPU 111 determines whether the travel distance L is not smaller than a threshold value TL. If the travel distance L is equal to or greater than the threshold value TL, the process proceeds to step S13; otherwise, the process is terminated. CPU 111 calculates, as the travel distance L, the distance between the position specified by the starting position stored in step S04 and the position specified by the positional information included in the mouse event detected in step S01.

In the following step S13, CPU 111 determines a designated direction. Specifically, CPU 111 determines, as the designated direction, the direction from the position specified by the starting position which has been stored in step S04, toward the position specified by the positional information included in the mouse event detected in step S01. The designated direction is one of the left, right, up, and down directions relative to the display surface of display portion 161 that is closest to the calculated direction.

In step S14, CPU 111 calculates a designation speed. The designation speed is calculated on the basis of the travel distance calculated in step S12. For example, the designation speed is obtained by dividing the travel distance calculated in step S12 by the time elapsed from when the mouse event with the state "Press" was detected to when the mouse event was detected in step S01. Alternatively, the designation speed may be calculated on the basis of the mouse event detected in step S01 and the mouse event detected immediately before.

In step S15, CPU 111 determines whether the designation speed is not smaller than a threshold value TV. If the designation speed is equal to or greater than the threshold value TV, the process proceeds to step S16; otherwise, the process proceeds to step S17. In step S16, CPU 111 determines the gesture event to be "Swipe", and the process proceeds to step S18. In step S17, CPU 111 determines the gesture event to be "Flick", and the process proceeds to step S18.

In step S18, CPU 111 determines whether a process corresponding to the determined gesture event has been defined in master table 99 stored in HDD 115. If so, the process proceeds to step S19; otherwise, the process proceeds to step S20. In step S19, CPU 111 outputs the gesture event having the gesture identification information "Swipe", which has been determined in step S16, or the gesture event having the gesture identification information "Flick", which has been determined in step S17, and the process is terminated. In step S20, CPU 111 outputs a non-determination signal, and the process is terminated.

Figure 8A:
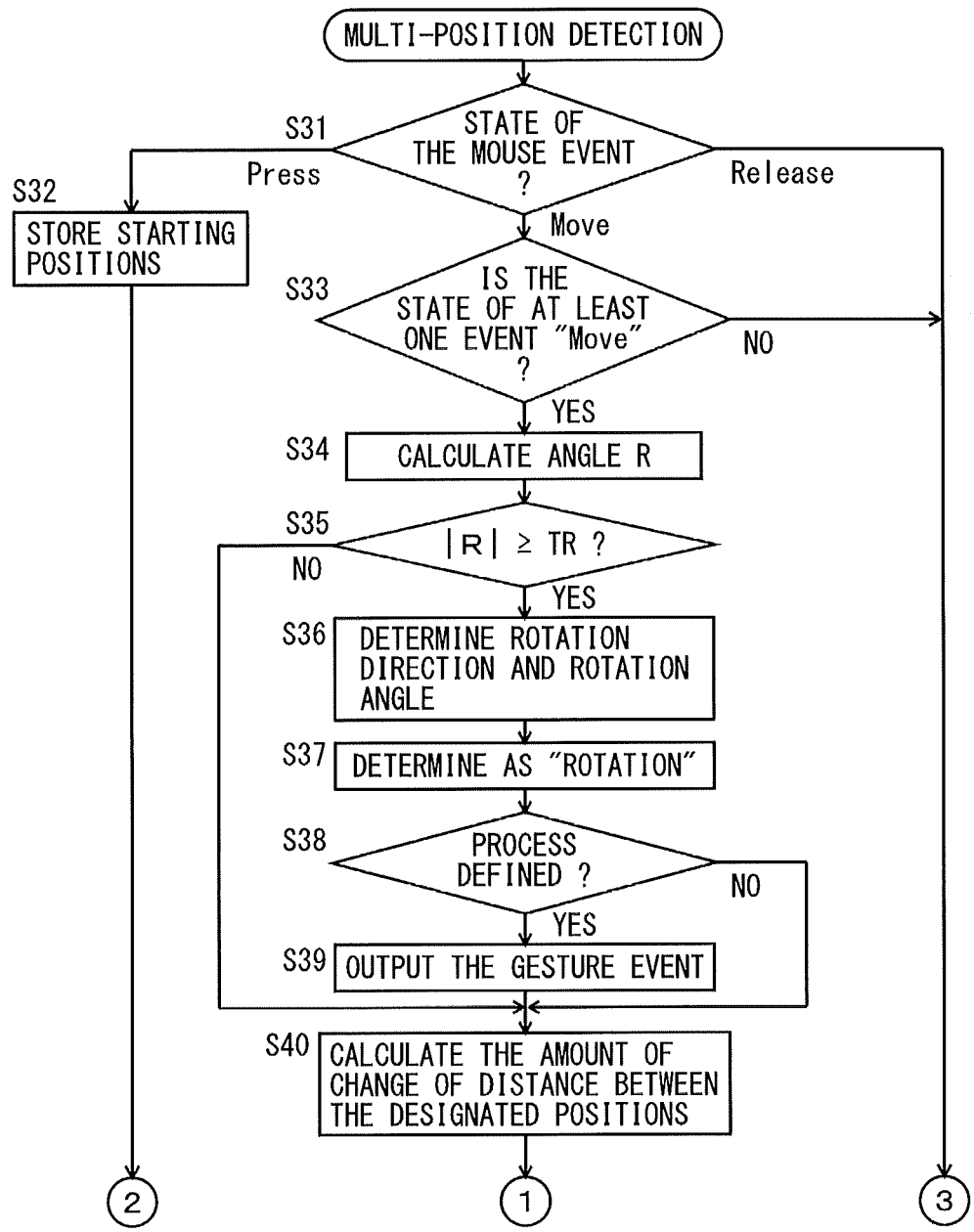
FIGS. 8A and 8B are flowcharts illustrating an example of the flow of a multi-position detecting process.
Figure 8B:
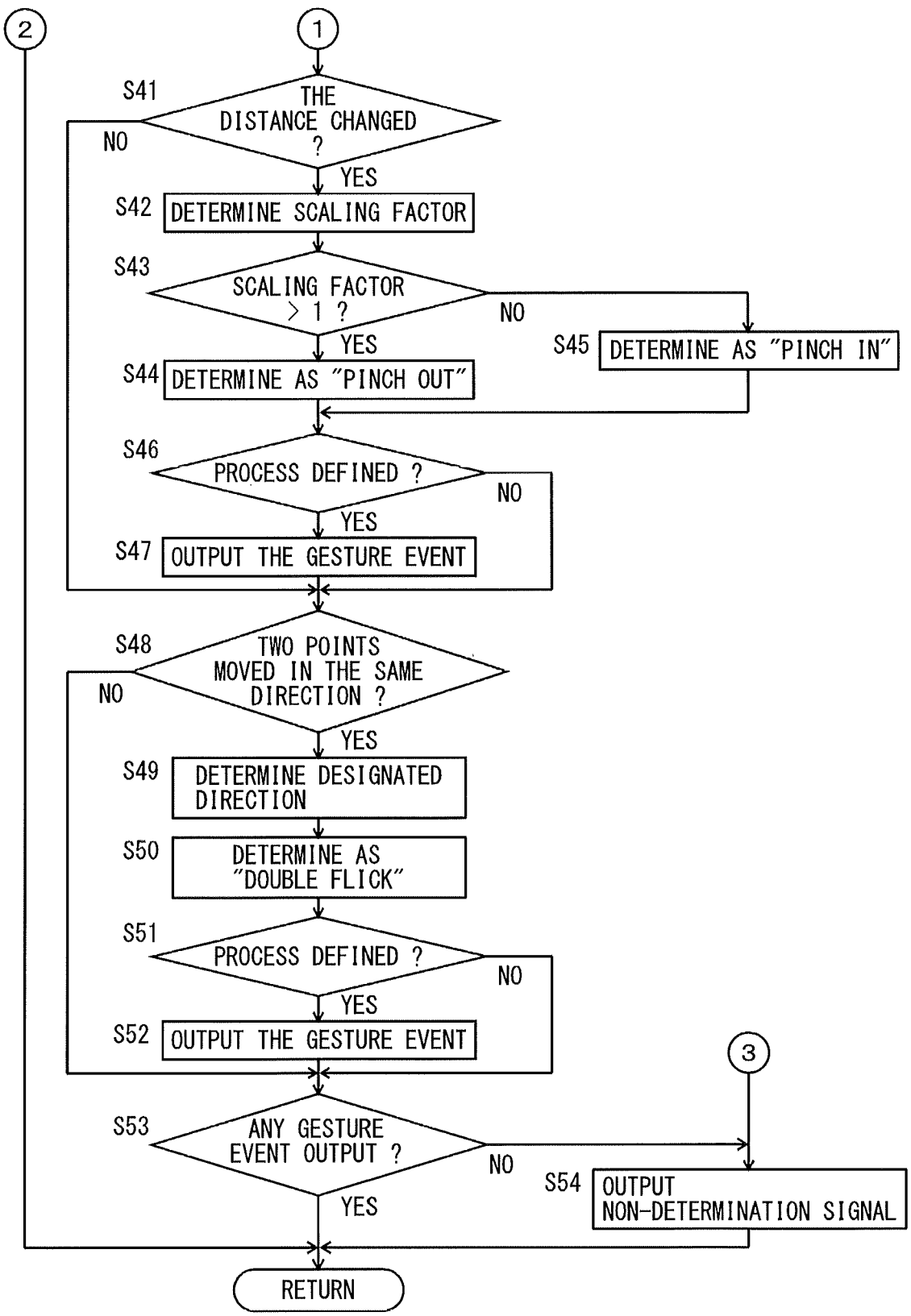

FIGS. 8A and 8B are flowcharts illustrating an example of the flow of the multi-position detecting process. The multi-position detecting process is carried out in step S21 in the gesture event determining process shown in FIG. 7. The multi-position detecting process is carried out when two mouse events have been detected. Referring to FIGS. 8A and 8B, in step S31, CPU 111 branches the process in accordance with the states of the two mouse events. If the state of at least one of the two mouse events is "Release", the process proceeds to step S54, if it is "Press", the process proceeds to step S32, and if it is "Move", the process proceeds to step S33. In step S32, CPU 111 stores, into RANI 114, the pieces of positional information included in the respective mouse events, as starting positions, and the process returns to the gesture event determining process.

In step S33, CPU 111 determines whether the state of at least one of the two mouse events is "Move". If so, the process proceeds to step S34; otherwise, the process proceeds to step S54. In step S54, CPU 111 outputs a non-determination signal, and the process returns to the gesture event determining process.

In step S34, CPU 111 calculates a rotation angle. Specifically, with reference to a prescribed reference side of the display surface of display portion 161, an angle of a straight line connecting two positions specified by the starting positions stored in step S32 with respect to the reference side is calculated as an angle R1. Further, an angle of a straight line connecting two positions specified by the pieces of positional information included in the detected two mouse events with respect to the reference side is calculated as an angle R2. The angle R1 is subtracted from the angle R2 to thereby calculate a rotation angle R. CPU 111 then determines, in step S35, whether an absolute value of the rotation angle R is equal to or greater than a threshold value TR. If the absolute value of the rotation angle R is the threshold value TR or more, the process proceeds to step S36; otherwise, the process proceeds to step S40. In step S36, CPU 111 determines a rotation direction and a rotation angle. The rotation direction is determined in accordance with the sign (negative or positive) of the rotation angle R. The rotation angle is determined to be the rotation angle R. In step S37, CPU 111 determines the gesture event to be "Rotation", and the process proceeds to step S38.

In step S38, CPU 111 determines whether the process corresponding to the determined gesture event has been defined in master table 99 stored in HDD 115. If so, the process proceeds to step S39; otherwise, the process proceeds to step S40, with step S39 being skipped. In step S39, CPU 111 outputs the gesture event having the gesture identification information "Rotation", determined in step S37.

In step S40, CPU 111 calculates an amount of change of the distance between the designated positions. Specifically, a distance L1 between the two positions specified by the starting positions stored in step S32 is calculated. Further, a distance L2 between the two positions specified by the pieces of positional information included in the detected two mouse events is calculated. Then, the difference between the distance L2 and the distance L1 is calculated as the amount of change of the distance between the designated positions.

In the following step S41, CPU 111 determines whether the distance has been changed. If the amount of change of the distance between the designated positions is equal to or greater than a prescribed value, it is determined that the distance has been changed. If the distance has been changed, the process proceeds to step S42; otherwise, the process proceeds to step S48.

In step S42, CPU 111 determines a scaling factor. Specifically, a value obtained by dividing the distance L2 by the distance L1 is determined as the scaling factor. In the following step S43, CPU 111 determines whether the scaling factor is greater than 1. If so, the process proceeds to step S44; otherwise, the process proceeds to step S45.

In step S44, CPU 111 determines the gesture event to be "Pinch Out", and the process proceeds to step S46. In step S45, CPU 111 determines the gesture event to be "Pinch In", and the process proceeds to step S46.

In step S46, CPU 111 determines whether the process corresponding to the determined gesture event has been defined in master table 99 stored in HUD 115. If so, the process proceeds to step S47; otherwise, the process proceeds to step S48, with step S47 being skipped. In step S47, CPU 111 outputs the gesture event having the gesture identification information "Pinch Out", determined in step S44, or the gesture event having the gesture identification information "Pinch In", determined in step S45.

In step S48, CPU 111 determines whether the moving directions of the two points are the same. Specifically, the moving directions of the positions specified by the respective pieces of positional information included in the two gesture events are compared. More specifically, the direction from one of the two positions specified by the starting positions stored in step S32 toward the position specified by the positional information included in the corresponding one of the detected two mouse events is calculated as the moving direction of the one point. Further, the direction from the other one of the two positions specified by the starting positions stored in step S32 toward the position specified by the positional information included in the corresponding, other one of the detected two mouse events is calculated as the moving direction of the other point. If the calculated directions are the same, the process proceeds to step S49; otherwise, the process proceeds to step S53.

In step S49, CPU 111 determines a designated direction. Specifically, the moving direction calculated in step S48 is determined to be the designated direction. In step S50, CPU 111 determines the gesture event to be "Double Flick", and the process proceeds to step S51. In step S51, CPU 111 determines whether the process corresponding to the determined gesture event has been defined in master table 99 stored in HDD 115. If so, the process proceeds to step S52; otherwise, the process proceeds to step S53, with step S52 being skipped. In step S52, CPU 111 outputs the gesture event having the gesture identification information "Double Flick", determined in step S50.

In step S53, CPU 111 determines whether a gesture event has been output. If at least one of steps S39, S47, and S52 has been executed, it is determined that a gesture event has been output. If at least one gesture event has been output, the process returns to the gesture event determining process; otherwise, the process proceeds to step S54. In step S54, CPU 111 outputs a non-determination signal, and the process returns to the gesture event determining process.

Figure 9:
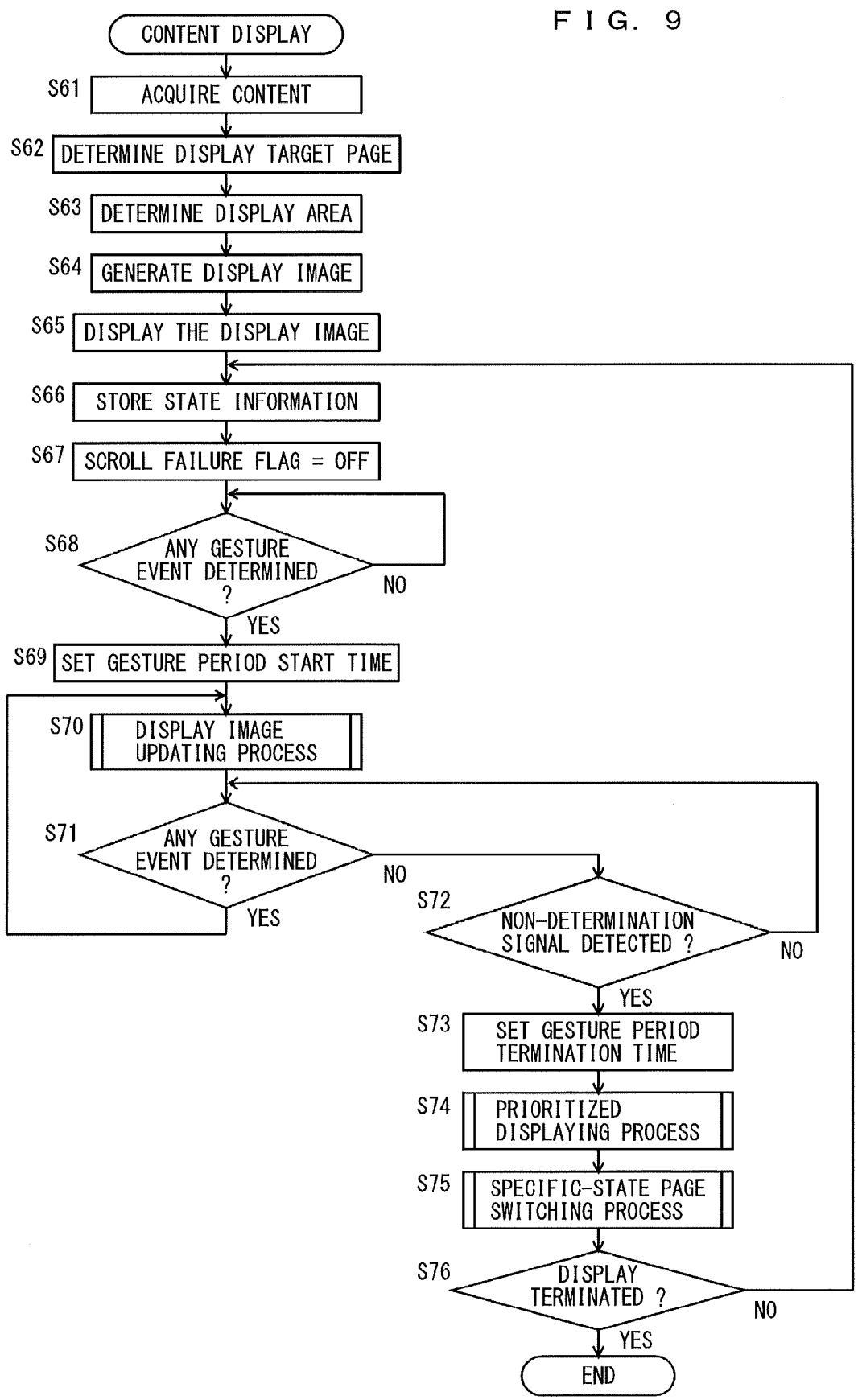
FIG. 9 is a flowchart illustrating an example of the flow of a content displaying process.

FIG. 9 is a flowchart illustrating an example of the flow of a content displaying process. The content displaying process is carried out by CPU 111 included in MFP 100 as CPU 111 executes a content displaying program stored in ROM 113, HDD 115, or CD-ROM 118. Referring to FIG. 9, CPU 111 acquires content (step S61). For example, in the case where the content is a Web page stored in an external Web server, CPU 111 controls communication I/F portion 112 to receive the Web page from the Web server. In the case where the content is application data or image data stored in HDD 115, CPU 111 reads the application data or image data from HDD 115.

In step S62, CPU 111 determines a display target page. If the content acquired in step S61 includes a plurality of pages, CPU 111 determines the first (front) page as the display target page. If the content has a single page, CPU 111 determines the entire content as the display target page. In step S63, CPU 111 determines a display area. Specifically, CPU 111 determines at least a part of the display target page as the display area. It is here assumed that the display target page as a whole is determined as the display area.

In the following step S64, CPU 111 generates a display image corresponding to the display area of the display target page determined in step S62. CPU 111 then displays the generated display image on display portion 161 (step S65), and the process proceeds to step S66. Specifically, the display image is stored into the VRAM in display portion 161, and the display image is displayed on display portion 161.

In step S66, CPU 111 stores state information. The state information includes the page number of the display target page, and the size and position within the page of the display area. In the following step S67, CPU 111 sets a scroll failure flag OFF. CPU 111 then determines whether a gesture event has been determined (step S68). In the case where a gesture event is output in the above-described gesture event determining process, it is determined that a gesture event has been determined. CPU 111 is in a standby mode until a gesture event is determined (NO in step S68), and once the gesture event has been determined (YES in step S68), the process proceeds to step S69.

In step S69, CPU 111 sets a gesture period start time. Specifically, the time corresponding to that time point is set as the gesture period start time. CPU 111 then carries out a display image updating process (step S70), and the process proceeds to step S71. The display image updating process is a process of updating the display image on the basis of the gesture event determined in step S68 or S71. The display image updating process will be described in detail later.

In step S71, CPU 111 determines whether a gesture event has been determined. If so, the process returns to step S70; otherwise, the process proceeds to step S72. In step S72, CPU 111 determines whether a non-determination signal has been detected. Here, any non-determination signal output in the above-described gesture event determining process is detected. If a non-determination signal has been detected, the process proceeds to step S73; otherwise, the process returns to step S71.

In step S73, CPU 111 sets a gesture period termination time. Specifically, the time at that time point is set as the gesture period termination time. CPU 111 then carries out a prioritized displaying process (step S74) and a specific-state page switching process (step S75), and the process proceeds to step S76. The prioritized displaying process and the specific-state page switching process will be described in detail later. In step S76, CPU 111 determines whether an instruction to terminate the display of the content has been accepted. For example, in the case where one of the plurality of keys included in hard key portion 167 to which the instruction to terminate the content displaying program has been assigned is designated, the instruction to terminate the display of the content is accepted. If the instruction to terminate the display of the content has been accepted, the process is terminated; otherwise, the process returns to step S66.

Figure 10:
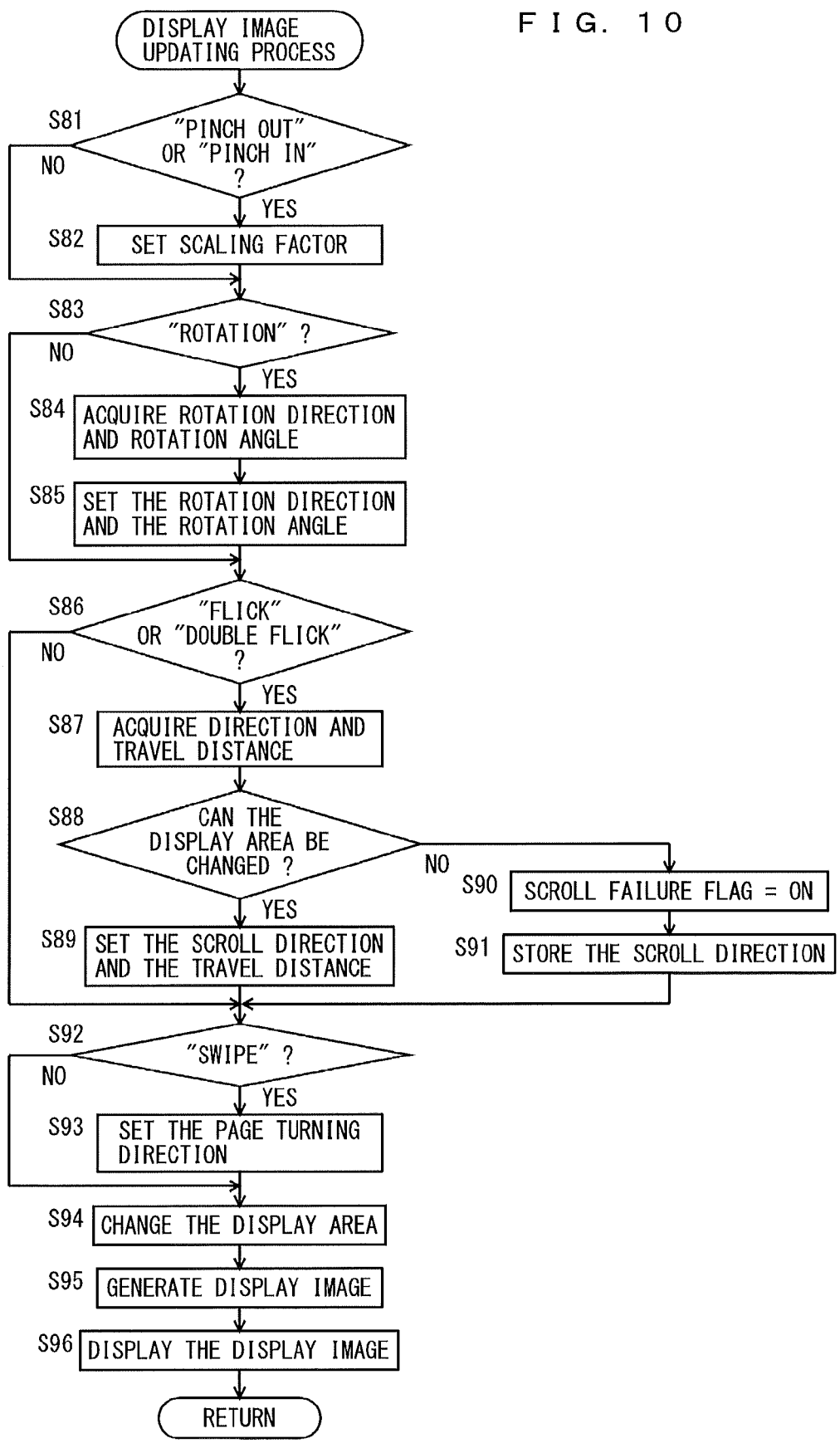
FIG. 10 is a flowchart illustrating an example of the flow of a display image updating process.

FIG. 10 is a flowchart illustrating an example of the flow of the display image updating process. The display image updating process is carried out in step S70 in the content displaying process shown in FIG. 9. In FIG. 9, at the stage before execution of step S70, the display target page and the display area have been determined and the gesture event has been determined. Referring to FIG. 10, CPU 111 determines whether the determined gesture event is "Pinch Out" or "Pinch In" (step S81). If the gesture event having the gesture identification information "Pinch Out" or the gesture event having the gesture identification information "Pinch In" has been determined, the process proceeds to step S82; otherwise, the process proceeds to step S83. In step S82, CPU 111 sets a scaling factor for changing the display area. Specifically, the scaling factor included as the parameter in the gesture event is set as the scaling factor for changing the display area.

In step S83, CPU 111 determines whether the determined gesture event is "Rotation". If the gesture event having the gesture identification information "Rotation" has been determined, the process proceeds to step S84; otherwise, the process proceeds to step S86. In step S84, CPU 111 acquires a rotation direction and a rotation angle. Specifically, the rotation direction and the rotation angle included as the parameters in the gesture event are acquired. In the following step S85, CPU 111 sets the acquired rotation direction and rotation angle as the rotation direction and rotation angle for generating a display image, and the process proceeds to step S86.

In step S86, CPU 111 determines whether the determined gesture event is "Flick" or "Double Flick". If the gesture event having the gesture identification information "Flick" or the gesture event having the gesture identification information "Double Flick" has been determined, the process proceeds to step S87; otherwise, the process proceeds to step S92. In step S87, CPU 111 acquires a scroll direction and a distance. Specifically, the direction and the travel distance included as the parameters in the gesture event are acquired. In the following step S88, CPU 111 determines whether it is possible to change the display area. Specifically, it is determined whether the display area can be translated in the direction acquired in step S87 by the travel distance acquired therein. In the case where the display target page includes a region having the width corresponding to the travel distance acquired in step S87 in the acquired direction with respect to the region in which the display area before being translated is arranged, then it is determined that the display area can be changed. If CPU 111 determines that the display area can be changed, the process proceeds to step S89; otherwise, the process proceeds to step S90.

In step S89, CPU 111 sets the direction and the travel distance acquired in step S87 as the scroll direction and the travel distance for changing the display area, and the process proceeds to step S92. On the other hand, in step S90, CPU 111 sets the scroll failure flag ON, and the process proceeds to step S91. In step S91, CPU 111 stores into RAM 114 the direction acquired in step S87, as the scroll direction, and the process proceeds to step S92.

In step S92, CPU 111 determines whether the determined gesture event is "Swipe". If the gesture event having the gesture identification information "Swipe" has been determined, the process proceeds to step S93; otherwise, the process proceeds to step S94. In step S93, CPU 111 sets a page turning direction, and the process proceeds to step S94. The page turning direction is determined on the basis of the direction included as the parameter in the gesture event. Specifically, if the direction indicates "up" or "left", the page turning direction indicating the preceding page is determined. If the direction indicates "down" or "right", the page turning direction indicating the succeeding page is determined.

In step S94, CPU 111 changes the display area. CPU 111 specifies, from the state information, the display area at the gesture period start time, and changes the specified display area on the basis of the scaling factor set in step S82, the scroll direction and the travel distance set in step S89, or the page turning direction set in step S93. The state information includes the page number for specifying the display target page, the position of the display area, and the size of the display area.

In the case where step S93 has been carried out and the page turning direction has been set, CPU 111 changes the page number of the display target page to the page number of the page determined by the page turning direction. If the page turning direction indicates the preceding page, the page number is changed to that of the preceding page. In the case where the page having the page number determined by the state information is the first (front) page, the page number is changed to that of the last page. If the page turning direction indicates the succeeding page, the page number is changed to that of the succeeding page. In the case where the page having the page number determined by the state information is the last page, the page number is changed to that of the first (front) page.

In the case where step S82 has been carried out and the scaling factor has been set, CPU 111 changes the size of the display area to the size determined by the scaling factor. In the case where step S89 has been carried out and the scroll direction and the travel distance have been set, CPU 111 changes the position of the display area to the position translated by the travel distance in the direction determined by the scroll direction.

In step S95, CPU 111 generates a display image. Specifically, an image of the area, within the content, corresponding to the display area after it has been changed in step S94 is generated as the display image. In the case where step S85 has been carried out and the rotation direction and the rotation angle have been set, the image obtained by rotating the display area in the rotation direction by the rotation angle is generated as the display image. Here, the rotation angles may be divided into prescribed ranges and an angle by which the display area is to be rotated may be predetermined for each range. Then, when a rotation angle is set, the display area may be rotated by the angle predetermined for the range to which the rotation angle belongs. For example, it may be predetermined such that the display area is rotated by 90 degrees when the rotation angle falls within the range of greater than 0 degrees and not greater than 30 degrees, and that it is rotated by 180 degrees when the rotation angle falls within the range of greater than 30 degrees and not greater than 60 degrees. Then, in the case where the rotation angle belongs to the range of greater than 0 degrees and not greater than 30 degrees, an image obtained by rotating the display area by 90 degrees may be set as the display image. In the case where the rotation angle belongs to the range of greater than 30 degrees and not greater than 60 degrees, an image obtained by rotating the display area by 180 degrees may be set as the display image.

In step S96, CPU 111 displays the generated display image on display portion 161, and the process returns to the content displaying process.

Figure 11:
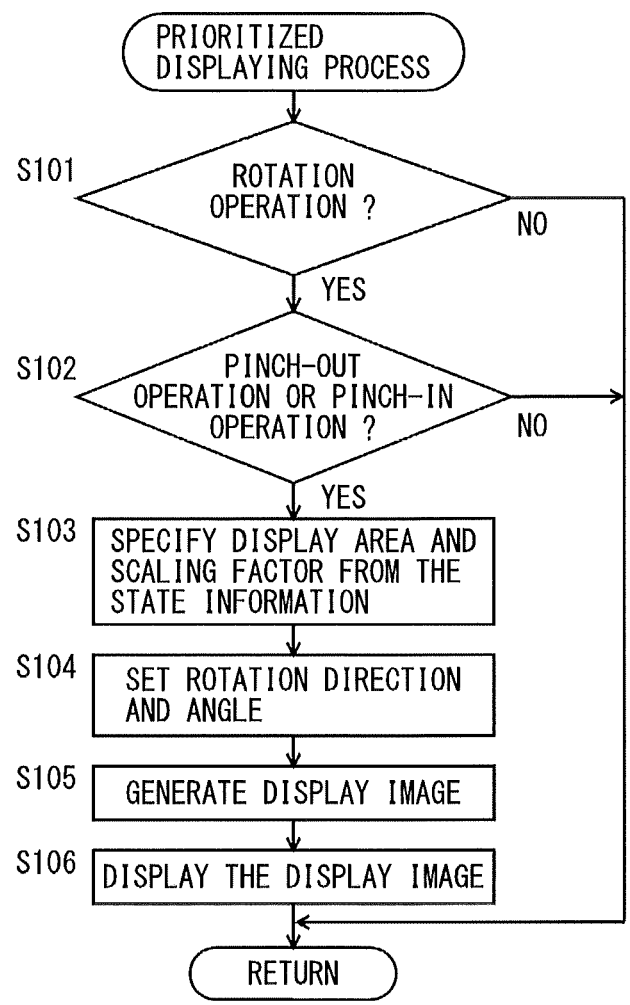
FIG. 11 is a flowchart illustrating an example of the flow of a prioritized displaying process.

FIG. 11 is a flowchart illustrating an example of the flow of the prioritized displaying process. The prioritized displaying process is carried out in step S74 in the content displaying process shown in FIG. 9. Referring to FIG. 11, CPU 111 determines whether a rotation operation has been performed during the gesture period (step S101). If the gesture event having the gesture identification information "Rotation" has been determined during the gesture period, it is determined that a rotation operation has been performed. If so, the process proceeds to step S102; otherwise, the process returns to the content displaying process.

In step S102, CPU 111 determines whether a pinch-out operation or a pinch-in operation has been performed during the gesture period. If the gesture event having the gesture identification information "Pinch Out" has been determined during the gesture period, it is determined that the pinch-out operation has been performed. If the gesture event having the gesture identification information "Pinch In" has been determined during the gesture period, it is determined that the pinch-in operation has been performed. If at least one of the pinch-out operation and the pinch-in operation has been performed during the gesture period, the process proceeds to step S103; otherwise, the process returns to the content displaying process.

In step S103, CPU 111 specifies a display area and a scaling factor from the state information. This is for generating a display image on the basis of the display area and the scaling factor at the gesture period start time. In the following step S104, CPU 111 sets a rotation direction and a rotation angle. Specifically, the rotation direction and the rotation angle included as the parameters in the gesture event having the gesture identification information "Rotation" that was lastly determined during the gesture period are set as the rotation direction and the rotation angle for generating a display image.

In step S105, CPU 111 generates a display image on the basis of the display area specified in step S103 as well as the rotation direction and the rotation angle set in step S104. Specifically, the image of the display area specified in step S103 is rotated in the rotation direction by the rotation angle which have been set in step S104, and the resultant image is set as the display image. It is noted that the rotation angles may be divided into prescribed ranges and an angle by which the display area is to be rotated may be predetermined for each range. Then, when a rotation angle is set, the display area may be rotated by the angle predetermined for the range to which the rotation angle belongs. For example, it may be predetermined such that the display area is rotated by 90 degrees when the rotation angle falls within the range of greater than 0 degrees and not greater than 30 degrees, and that it is rotated by 180 degrees when the rotation angle falls within the range of greater than 30 degrees and not greater than 60 degrees. Then, in the case where the rotation angle belongs to the range of greater than 0 degrees and not greater than 30 degrees, the display area is rotated by 90 degrees. In the case where the rotation angle belongs to the range of greater than 30 degrees and not greater than 60 degrees, the display area is rotated by 180 degrees.

In the following step S106, CPU 111 displays the generated display image on display portion 161, and the process returns to the content displaying process.

Figure 12:
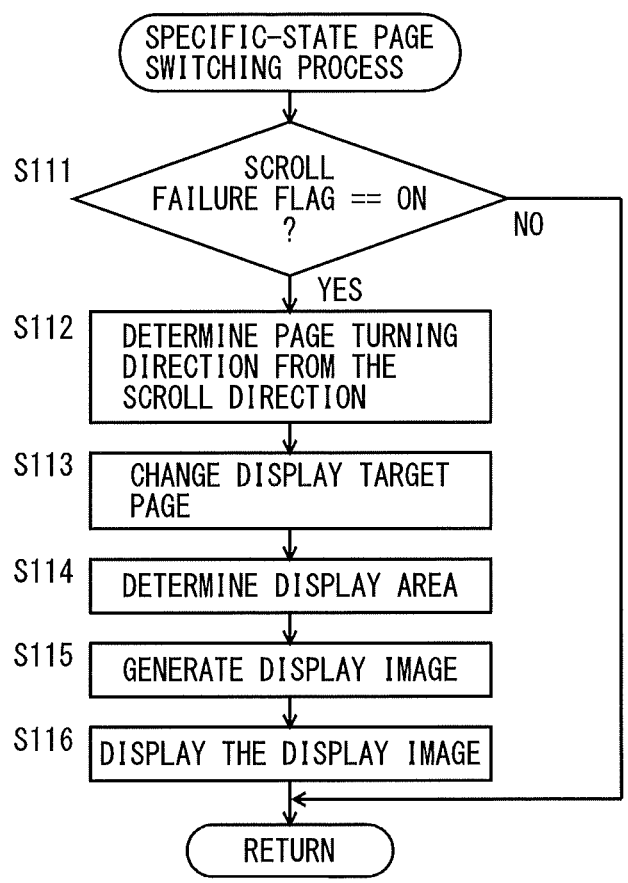
FIG. 12 is a flowchart illustrating an example of the flow of a specific-state page switching process.

FIG. 12 is a flowchart illustrating an example of the flow of the specific-state page switching process. The specific-state page switching process is carried out in step S75 in the content displaying process shown in FIG. 9. Referring to FIG. 12, CPU 111 determines whether the scroll failure flag has been set ON (step S111). The scroll failure flag is set OFF, in step S67 in the content displaying process shown in FIG. 9, as an initial value at the gesture period start time. It is set ON, in step S90 in the display image updating process shown in FIG. 10, in the case where scrolling cannot be performed. If the scroll failure flag has been set ON, the process proceeds to step S112; otherwise, the process returns to the content displaying process.

In step S112, CPU 111 determines the page turning direction on the basis of the scroll direction stored in RAM 114. The scroll direction is stored into RAM 114, in step S91 in the display image updating process shown in FIG. 10, in the case where scrolling cannot be performed. If the scroll direction indicates "up" or "left", the page turning direction indicating the preceding page is determined. If the scroll direction indicates "down" or "right", the page turning direction indicating the succeeding page is determined.

In the following step S113, CPU 111 changes the display target page. Specifically, the page number of the display target page is changed to the page number of the page determined by the page turning direction. If the page turning direction indicates the preceding page, the page number is changed to that of the preceding page. In the case where the page of the page number determined by the state information is the first (front) page, the page number is changed to that of the last page. If the page turning direction indicates the succeeding page, the page number is changed to that of the succeeding page. In the case where the page of the page number determined by the state information is the last page, the page number is changed to that of the first (front) page.

In the following step S114, CPU 111 determines a display area. The display area may be an area predetermined for the page, or it may be determined in accordance with the position and size of the display area that had been set in the display target page before the same was changed.

In the following step S115, CPU 111 generates a display image. CPU 111 generates, as the display image, an image of the area, within the content, that corresponds to the display area in the display target page that has been changed in step S113. CPU 111 displays the generated display image on display portion 161 (step S116), and the process returns to the content displaying process.

Figure 13:
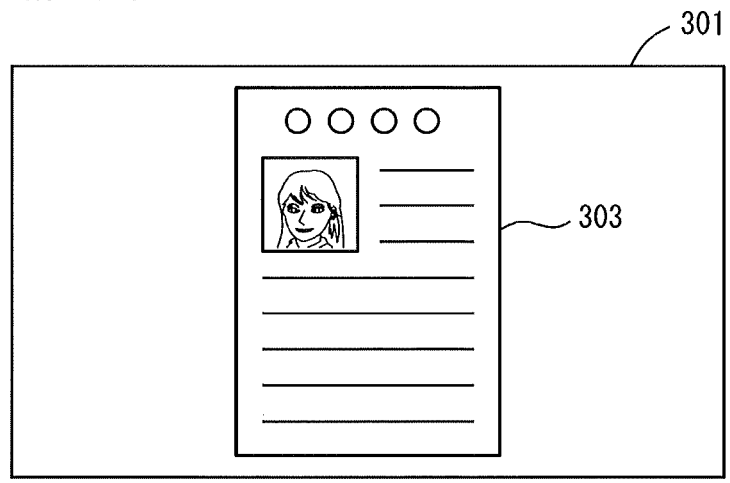
FIGS. 13 to 17 show screen display examples.

The prioritized displaying process will now be described in conjunction with screens displayed on display portion 161. FIG. 13 shows a first screen display example. Referring to FIG. 13, a screen 301 includes a display image 303. Display image 303 corresponds to a whole image of one page in application data. In the state where screen 301 shown in FIG. 13 is being displayed on display portion 161, a user may input a rotation operation in order to rotate display image 303 by 90 degrees to the right. Specifically, the user may touch the touch panel with his/her thumb and forefinger simultaneously and, while remaining touching the panel surface, perform an operation of drawing an arc by turning the forefinger clockwise about the thumb. During the rotation operation, however, the distance between the positions touched by the thumb and forefinger may become shorter, in which case MFP 100 will accept the user operation as both the rotation operation and the pinch-in operation.

Figure 14:
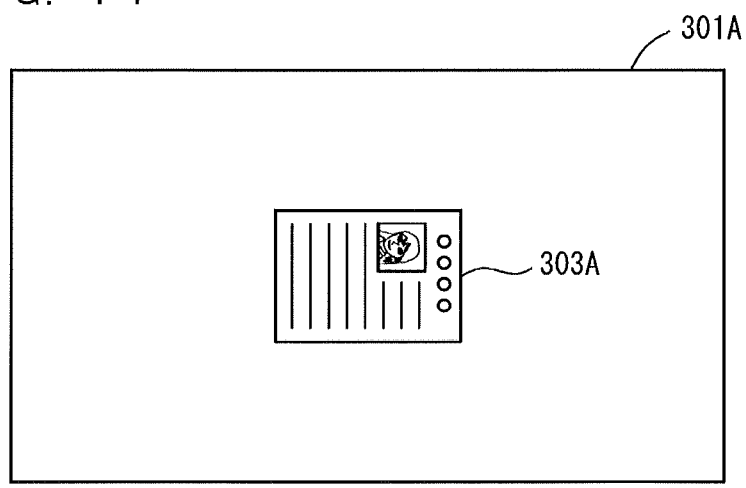

FIG. 14 shows a second screen display example. The screen 301A shown in FIG. 14 is a screen which is displayed when the rotation and pinch-in operations were accepted as the user operations in the state where screen 301 shown in FIG. 13 was being displayed and processes corresponding to the operations have been carried out. Referring to FIG. 14, screen 301A includes a display image 303A, which corresponds to display image 303, included in screen 301 shown in FIG. 13, that has been rotated clockwise by 90 degrees and reduced in size by 50%.

According to the present embodiment, in the case where MFP 100 accepts a rotation operation and a pinch-in operation during a single gesture period, at the time point of termination of the gesture period, MFP 100 displays a display image by determining that the rotation operation has been accepted but the pinch-in operation has not been accepted. Therefore, the image during the process, as shown in FIG. 14, does not necessarily have to be displayed; the screen shown in FIG. 15, described later, may be displayed directly from the screen shown in FIG. 13. This may reduce flickering in the screen.

Figure 15:
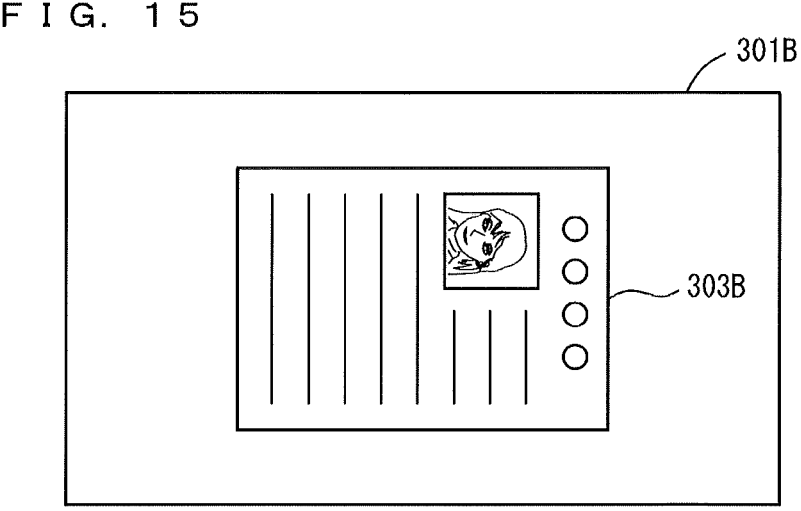

FIG. 15 shows a third screen display example. The screen 301B shown in FIG. 15 is a screen which is displayed after a user has finished his/her operation after rotation and pinch-in operations were accepted as the user operations in the state where screen 301 shown in FIG. 13 was being displayed. Referring to FIG. 15, screen 301B includes a display image 303B, which corresponds to display image 303, included in screen 301 shown in FIG. 13, that has been rotated clockwise by 90 degrees. Display image 303B is identical in size to display image 303.

In the present embodiment, it has been configured such that, in the case where a rotation operation and a pinch-in or pinch-out operation are accepted during a gesture period, the display area is changed and a display image obtained by changing the direction of the changed display area is displayed during the gesture period. Alternatively, it may be configured such that, after the start of a gesture period, once a gesture event having the gesture identification information "Rotation" corresponding to the rotation operation has been determined, the display area will not be changed on the basis of a gesture event having the gesture identification information "Pinch In" or "Pinch Out" corresponding to the pinch-in or pinch-out operation. This can inform the user that the rotation operation is prioritized over the pinch-in or pinch-out operation.

Figure 16:
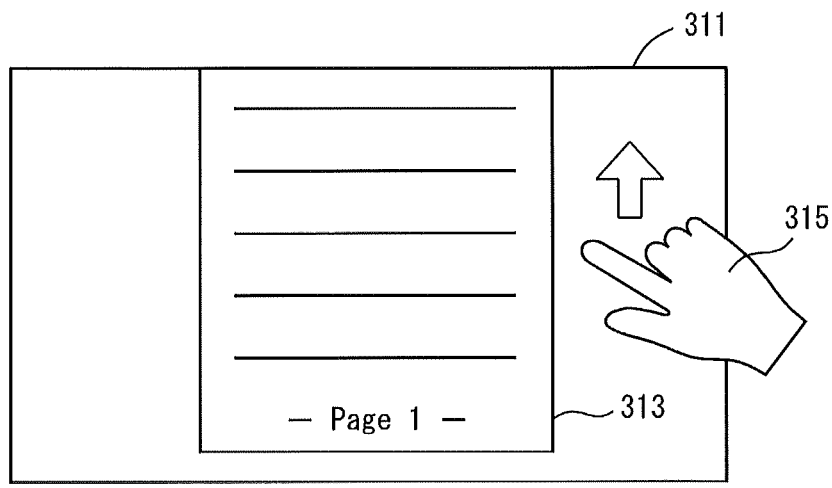

The specific-state page switching process will now be described in conjunction with screens displayed on display portion 161. FIG. 16 shows a fourth screen display example. Referring to FIG. 16, a screen 311 includes a display image 313, which corresponds to a lower part of a first page of application data. In the state where screen 311 shown in FIG. 16 is being displayed on display portion 161, when a user inputs a downward scrolling operation of moving his/her finger 315 in the direction indicated by the arrow in the figure while touching the panel screen, MFP 100 accepts the scrolling operation. However, display image 313 cannot be scrolled downward, because it corresponds to the lower part of the first page of the application data. In the case where the scrolling operation has been accepted but the scrolling cannot be performed, MFP 100 switches the page in the direction corresponding to the scroll direction, and displays a screen as shown in FIG. 17.

Figure 17:
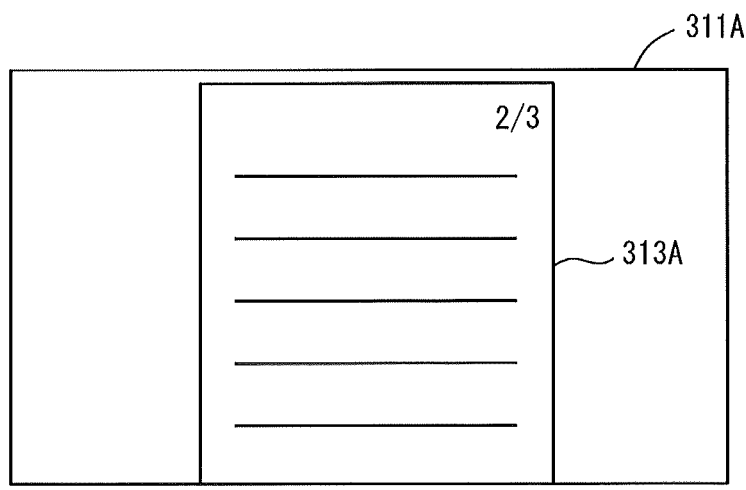

FIG. 17 shows a fifth screen display example. Referring to FIG. 17, the screen 311A includes a display image 313A, which is an image of an upper part of the second page of the application data.

As described above, MFP 100 according to the present embodiment functions as a data processing apparatus, and displays a display area which corresponds to at least a part of content. When a user uses his/her finger to touch and designate a position on touch panel 165, MFP 100 temporarily stores state information for specifying the display area at a time point of start of a gesture period. Then, in the case where a first gesture event corresponding to a process which involves a change of the display area and a second gesture event corresponding to a process which involves no change of the display area are determined during the gesture period, MFP 100 generates a display image for displaying the display area specified by the stored state information, on the basis of the second gesture event, and displays the display image. Here, the first gesture event is determined in accordance with the user's flick operation, double-flick operation, pinch-out operation, pinch-in operation, or swipe operation. The second gesture event is determined in accordance with the user's rotation operation. As such, during the gesture period, the process of generating a display image based on the second gesture event is prioritized over the process of generating a display image based on the first gesture event. This makes it possible to associate a single user operation with a single process.

In the case where MFP 100 determines the first gesture event, MFP 100 generates a display image with the display area within the content changed, and displays the generated display image. In the case where MFP 100 determines the second gesture event, MFP 100 generates a display image with the direction of the display area changed, and displays the generated display image. As the change in direction of the display area is prioritized over the change of the display area within the content, the user can readily input the operation of changing the direction of the display area, without changing the display area.

Further, during the gesture period, the display area within the content is changed, and a display image with the direction of the display area changed is displayed. Once the gesture period is finished, however, the display image with the direction of the display area changed is displayed. This enables the user to continue the operation while confirming the display image.

After the start of a gesture period, once the second gesture event is determined, the display area will not be changed. This can inform the user that the second gesture event is prioritized over the first gesture event.

Further, when a pinch-in or pinch-out operation is accepted, the first gesture event is determined, and the size of the display area is changed. When a swipe operation is accepted, the first gesture event is determined, and the position of the display area within the content is changed. Accordingly, the display image can be changed to an image obtained by enlarging or reducing the area within the content or to an image of an arbitrary area within the content.

In the case where two positions are detected simultaneously and when a pinch-in or pinch-out operation, in which the distance between the two positions detected at a prescribed time interval is changed, or a double-flick operation, in which a difference between the moving directions of the two positions is within a prescribed range, is accepted, the first gesture event is determined. In the case where two positions are detected simultaneously and when a rotation operation, in which an inclination of the straight line passing through the two positions detected at a prescribed time interval is changed by at least a prescribed angle, is accepted, the second gesture event is determined. A user can thus input a plurality of types of operations with two fingers.

In the case where a gesture event corresponding to the swipe operation is determined, the page is switched. In the case where a gesture event corresponding to the flick or double-flick operation is determined, the display area is changed within the page. In the case where a gesture event corresponding to the flick or double-flick operation is determined and if it is not possible to change the display area within the page, then the page is switched. That is, when a user inputs a flick or double-flick operation in the state where it is not possible to change the display area within a page, the page is switched. This eliminates the need for the user to input the swipe operation again. The user operations can thus be simplified.

Even in the case where the display area can be changed within the display target page at the time point of start of a gesture period, if there is a period, during the gesture period, in which the display area cannot be changed, the page is switched at the time point of termination of the gesture period. This enables a display image of a display area in another page to be displayed at the termination of the gesture period.

During the gesture period, the display area within the display target page is changed, each time a gesture event corresponding to the flick operation or the double-flick operation is determined, until it is no longer possible to change the display area within the display target page. Accordingly, during the gesture period, it is possible to display a display image by changing the display area within the display target page. That is, with a single user operation, a display image with the display area changed in the display target page and a display image of a display area after the page has been switched can be displayed.

While MFP 100 has been described as an example of the data processing apparatus in the above embodiment, the present invention may of course be understood as a content displaying method for causing CPU 111 controlling MFP 100 to perform the processing shown in FIGS. 7 to 12, or as a content displaying program for causing CPU 111 to perform the content displaying method.

Although the present invention has been described and illustrated in detail, it is clearly understood that the same is by way of illustration and example only and is not to be taken by way of limitation, the spirit and scope of the present invention being limited only by the terms of the appended claims.

<Appendix>

According to an aspect of the present invention, there is provided a data processing apparatus which includes a display portion capable of displaying an image, a position detecting portion capable of detecting one or more positions designated by a user on a display surface of the display portion, and a control portion, wherein the control portion includes: a content displaying portion to display, on the display portion, an image of a display area corresponding to at least a part of a display target page among a plurality of pages included in content; and a gesture event determining portion operable to determine at least one of a plurality of gesture events on the basis of the one or more positions detected by said position detecting portion. The content displaying portion includes a display image generating portion to generate a display image for displaying the display area on the basis of the at least one gesture event determined by the gesture event determining portion, and a display control portion to display the generated display image on the display portion. The display image generating portion includes a page switching portion to change the display target page to another page in the case where the gesture event determining portion determines a third gesture event, a scrolling portion to change the display area within the display target page in the case where the gesture event determining portion determines a fourth gesture event, and a specific-state page switching portion operable, in the case where the gesture event determining portion determines the fourth gesture event and in the case where the scrolling portion cannot change the display area, to change the display target page to another page.

According to this aspect, in the state where a display area corresponding to at least a part of content is being displayed, in the case where the third gesture event is determined, the display target page is changed to another page. In the case where the fourth gesture event is determined, the display area is changed within the display target page. In the case where the fourth gesture event is determined but the display area cannot be changed within the display target page, the display target page is changed to another page. Accordingly, in the case where it is not possible to change the display image when the fourth gesture event is determined, the display image identical to that in the case where the third gesture event is determined can be displayed. This eliminates the need for the user to input the operation corresponding to the third gesture event again. As a result, it is possible to provide a data processing apparatus which can reduce operational errors by a user.

Preferably, it is configured such that, even in the case where the scrolling portion can change the display area at a time point of start of a gesture period during which one or more positions are continuously detected by the position detecting portion, if there is a period, until a termination of the gesture period, in which the scrolling portion cannot change the display area, the specific-state page switching portion changes the display target page to another page at the time point of the termination of the gesture period.

According to this aspect, even if it is possible to change the display area within the display target page at the time point of the start of a gesture period, if there is a period, until a termination of the gesture period, in which it is not possible to change the display area within the display target page, the display target page is changed to another page at the time point of the termination of the gesture period. Accordingly, even if the display area can be changed within the display target page at the start of a gesture period, a display image corresponding to a display area in another page can be displayed at the termination of the gesture period. As a result, even when a user inputs an operation of changing the display area in the state where the display area cannot be changed, it is possible to display a display image with the page switched.

Preferably, it is configured such that, each time the fourth gesture event is determined by the gesture event determining portion during the gesture period, the scrolling portion changes the display area until it is no longer possible to change the display area within the display target page.

According to this aspect, during the gesture period, each time the fourth gesture event is determined, the display area is changed until it is no longer possible to change the display area within the display target page. Accordingly, during the gesture period, the display image can be displayed by changing the display area within the display target page. That is, with a single user operation, a display image with the display area changed within the display target page and a display image of a display area after the page has been switched can be displayed.

Preferably, the gesture event determining portion includes a flick determining portion which determines the fourth gesture event in the case where a moving speed of the position detected by the position detecting portion is smaller than a threshold value, and a swipe determining portion which determines the third gesture event in the case where the moving speed of the position detected by the position detecting portion is equal to or greater than the threshold value.

According to this aspect, in the case where the moving speed of one position detected by the position detecting portion is smaller than the threshold value, the fourth gesture event is determined, while if the speed is not smaller than the threshold value, the third gesture event is determined. This allows the user to input different operations by changing only the speed of moving the designated position.

According to another aspect of the present invention, there is provided a content displaying method performed by a data processing apparatus which includes a display portion capable of displaying an image, and a position detecting portion capable of detecting one or more positions designated by a user on a display surface of the display portion, wherein the method causes the data processing apparatus to perform: a content displaying step of displaying, on the display portion, an image of a display area corresponding to at least a part of a display target page among a plurality of pages included in content; and a gesture event determining step of, in response to detection of one or more positions by the position detecting portion, determining at least one of a plurality of gesture events on the basis of the one or more positions detected. The content displaying step includes a display image generating step of generating a display image for displaying the display area on the basis of the at least one gesture event determined in the gesture event determining step, and a display control step of displaying the generated display image on the display portion. The display image generating step includes a page switching step of changing the display target page to another page in the case where a third gesture event is determined in the gesture event determining step, a scrolling step of changing the display area within the display target page in the case where a fourth gesture event is determined in the gesture event determining step, and a specific-state page switching step of, in the case where the fourth gesture event is determined in the gesture event determining step and in the case where the display area cannot be changed in the scrolling step, changing the display target page to another page.

According to this aspect, it is possible to provide a content displaying method which can reduce operational errors by a user.

Preferably, the specific-state page switching step includes a step of, even in the case where it is possible to change the display area in the scrolling step at a time point of start of a gesture period during which one or more positions are continuously detected by the position detecting portion, if there is a period, until a termination of the gesture period, in which the display area cannot be changed in the scrolling step, changing the display target page to another page at the time point of the termination of the gesture period.

Preferably, the scrolling step includes a step of, each time the fourth gesture event is determined in the gesture event determining step during the gesture period, changing the display area until it is no longer possible to change the display area within the display target page.

Preferably, the gesture event determining step includes a flick determining step of determining the fourth gesture event in the case where a moving speed of the position detected by the position detecting portion is smaller than a threshold value, and a swipe determining step of determining the third gesture event in the case where the moving speed of the position detected by the position detecting portion is equal to or greater than the threshold value.

According to a further aspect of the present invention, there is provided a non-transitory computer-readable recording medium encoded with a content displaying program performed by a computer which controls a data processing apparatus including a display portion capable of displaying an image and a position detecting portion capable of detecting one or more positions designated by a user on a display surface of the display portion, wherein the program causes the computer to perform: a content displaying step of displaying, on the display portion, an image of a display area corresponding to at least a part of a display target page among a plurality of pages included in content; and a gesture event determining step of, in response to detection of one or more positions by the position detecting portion, determining at least one of a plurality of gesture events on the basis of the one or more positions detected. The content displaying step includes a display image generating step of generating a display image for displaying the display area on the basis of the at least one gesture event determined in the gesture event determining step, and a display control step of displaying the generated display image on the display portion. The display image generating step includes a page switching step of changing the display target page to another page in the case where a third gesture event is determined in the gesture event determining step, a scrolling step of changing the display area within the display target page in the case where a fourth gesture event is determined in the gesture event determining step, and a specific-state page switching step of, in the case where the fourth gesture event is determined in the gesture event determining step and in the case where the display area cannot be changed in the scrolling step, changing the display target page to another page.

According to this aspect, it is possible to provide a content displaying program which can reduce operational errors by a user.

What is claimed is:

1. A data processing apparatus including
   a display portion capable of displaying an image,
   a position detecting portion capable of detecting one or more positions designated by a user on a display surface of said display portion, and
   a control portion,
   said control portion comprising:
   a content displaying portion to display, on said display portion, a display area corresponding to at least a part of content; and
   a gesture event determining portion operable to determine at least one of a plurality of gesture events on the basis of said one or more positions detected by said position detecting portion;
   said content displaying portion including
      a display image generating portion to generate a display image for displaying said display area on the basis of the at least one gesture event determined by said gesture event determining portion, and
      a display control portion to display said generated display image on said display portion,
   said display image generating portion including
      a state storing portion to temporarily store state information for specifying said display area at a time point of start of a gesture period during which one or more positions are continuously detected by said position detecting portion, and
      a prioritized displaying portion operable, in the case where a first gesture event corresponding to a process involving a change of said display area and a second gesture event corresponding to a process involving no change of said display area are determined during said gesture period by said gesture event determining portion, to generate a display image for displaying the display area specified by said stored state information, on the basis of said second gesture event.

2. The data processing apparatus according to claim 1, wherein said display image generating portion further includes
a display target changing portion operable, in the case where said first gesture event is determined by said gesture event determining portion, to change the display area within said content, and
a display direction changing portion operable, in the case where said second gesture event is determined by said gesture event determining portion, to generate a display image with a direction of said display area changed.

3. The data processing apparatus according to claim 2, wherein
each time said first gesture event is determined, said display target changing portion changes said display area,
each time said second gesture event is determined, said display direction changing portion generates a display image with the direction of said display area changed, and
on the basis of termination of said gesture period, said prioritized displaying portion generates a display image for displaying the display area determined by said stored state information, on the basis of said second gesture event determined during said gesture period.

4. The data processing apparatus according to claim 3, wherein said display target changing portion refrains from changing said display area once said second gesture event has been determined after the start of said gesture period.

5. The data processing apparatus according to claim 2, wherein said display target changing portion includes
a scaling portion to change a size of said display area, and
a scrolling portion to change a position within said content.

6. The data processing apparatus according to claim 1, wherein
in the case where two positions are detected simultaneously by said position detecting portion and in the case where a distance between the two positions detected at a prescribed time interval has changed or in the case where a difference of moving directions of the two positions is within a prescribed range, said gesture event determining portion determines said first gesture event, and
in the case where two positions are detected simultaneously by said position detecting portion and in the case where an inclination of a straight line passing through the two positions detected at a prescribed time interval has changed by a prescribed angle, said gesture event determining portion determines said second gesture event.

7. The data processing apparatus according to claim 1, wherein
said state storing portion temporarily stores a scaling factor of said display image at the time point of the start of the gesture period, and
in the case where a gesture event corresponding to a process of changing a scaling factor of said display image has been determined as said first gesture event by said gesture event determining portion, said prioritized displaying portion changes, on the basis of termination of said gesture period, the scaling factor of said display image to said temporarily stored scaling factor.

8. The data processing apparatus according to claim 7, wherein
said content displaying portion displays an image of content on said display portion, and
said display image generating portion generates an image for displaying said content.

9. A content displaying method performed by a data processing apparatus, the data processing apparatus including
a display portion capable of displaying an image and
a position detecting portion capable of detecting one or more positions designated by a user on a display surface of said display portion,
the method causing said data processing apparatus to perform;
a content displaying step of displaying, on said display portion, a display area corresponding to at least a part of content; and
a gesture event determining step of determining at least one of a plurality of gesture events on the basis of said one or more positions detected by said position detecting portion;
said content displaying step including
a display image generating step of generating a display image for displaying said display area on the basis of the at least one gesture event determined in said gesture event determining step, and
a display control step of displaying said generated display image on said display portion,
said display image generating step including
a state storing step of temporarily storing state information for specifying said display area at a time point of start of a gesture period during which one or more positions are continuously detected by said position detecting portion, and
a prioritized displaying step of, in the case where a first gesture event corresponding to a process involving a change of said display area and a second gesture event corresponding to a process involving no change of said display area are determined during said gesture period in said gesture event determining step, generating a display image for displaying the display area specified by said stored state information, on the basis of said second gesture event.

10. The content displaying method according to claim 9, wherein said display image generating step further includes
a display target changing step of, in the case where said first gesture event is determined in said gesture event determining step, changing the display area within said content, and
a display direction changing step of, in the case where said second gesture event is determined in said gesture event determining step, generating a display image with a direction of said display area changed.

11. The content displaying method according to claim 10, wherein
said display target changing step includes a step of changing said display area each time said first gesture event is determined,
said display direction changing step includes a step of, each time said second gesture event is determined, generating a display image with the direction of said display area changed, and
said prioritized displaying step includes a step of, on the basis of termination of said gesture period, generating a display image for displaying the display area determined by said stored state information, on the basis of said second gesture event determined during said gesture period.

12. The content displaying method according to claim 11, wherein said display target changing step includes a step of refraining from changing said display area once said second gesture event has been determined after the start of said gesture period.

13. The content displaying method according to claim 10, wherein said display target changing step includes
   a scaling step of changing a size of said display area, and
   a scrolling step of changing a position within said content.

14. The content displaying method according to claim 9, wherein said gesture event determining step includes
   a step of determining said first gesture event in the case where two positions are detected simultaneously by said position detecting portion and in the case where a distance between the two positions detected at a prescribed time interval has changed or in the case where a difference of moving directions of the two positions is within a prescribed range, and
   a step of determining said second gesture event in the case where two positions are detected simultaneously by said position detecting portion and in the case where an inclination of a straight line passing through the two positions detected at a prescribed time interval has changed by a prescribed angle.

15. The content displaying method according to claim 9, wherein
   said state storing step includes a step of temporarily storing a scaling factor of said display image at the time point of the start of the gesture period, and
   said prioritized displaying step includes a step of, in the case where a gesture event corresponding to a process of changing a scaling factor of said display image has been determined as said first gesture event in said gesture event determining step, changing, on the basis of termination of said gesture period, the scaling factor of said display image to said temporarily stored scaling factor.

16. The content displaying method according to claim 15, wherein
   said content displaying step includes a step of displaying an image of content on said display portion, and
   said display image generating step includes a step of generating an image for displaying said content.

17. A non-transitory computer-readable recording medium encoded with a content displaying program performed by a computer which controls a data processing apparatus,
   said data processing apparatus including
   a display portion capable of displaying an image and
   a position detecting portion capable of detecting one or more positions designated by a user on a display surface of said display portion,
   the program causing said computer to perform:
   a content displaying step of displaying, on said display portion, a display area corresponding to at least a part of content; and
   a gesture event determining step of determining at least one of a plurality of gesture events on the basis of said one or more positions detected by said position detecting portion;
   said content displaying step including
      a display image generating step of generating a display image for displaying said display area on the basis of the at least one gesture event determined in said gesture event determining step, and
   a display control step of displaying said generated display image on said display portion,
   said display image generating step including
      a state storing step of temporarily storing state information for specifying said display area at a time point of start of a gesture period during which one or more positions are continuously detected by said position detecting portion, and
      a prioritized displaying step of, in the case where a first gesture event corresponding to a process involving a change of said display area and a second gesture event corresponding to a process involving no change of said display area are determined during said gesture period in said gesture event determining step, generating a display image for displaying the display area specified by said stored state information, on the basis of said second gesture event.

18. The non-transitory computer-readable recording medium encoded with the content displaying program according to claim 17, wherein said display image generating step further includes
   a display target changing step of, in the case where said first gesture event is determined in said gesture event determining step, changing the display area within said content, and
   a display direction changing step of, in the case where said second gesture event is determined in said gesture event determining step, generating a display image with a direction of said display area changed.

19. The non-transitory computer-readable recording medium encoded with the content displaying program according to claim 18, wherein
   said display target changing step includes a step of changing said display area each time said first gesture event is determined,
   said display direction changing step includes a step of, each time said second gesture event is determined, generating a display image with the direction of said display area changed, and
   said prioritized displaying step includes a step of, on the basis of termination of said gesture period, generating a display image for displaying the display area determined by said stored state information, on the basis of said second gesture event determined during said gesture period.

20. The non-transitory computer-readable recording medium encoded with the content displaying program according to claim 19, wherein said display target changing step includes a step of refraining from changing said display area once said second gesture event has been determined after the start of said gesture period.

21. The non-transitory computer-readable recording medium encoded with the content displaying program according to claim 18, wherein said display target changing step includes
   a scaling step of changing a size of said display area, and
   a scrolling step of changing a position within said content.

22. The non-transitory computer-readable recording medium encoded with the content displaying program according to claim 17, wherein said gesture event determining step includes
   a step of determining said first gesture event in the case where two positions are detected simultaneously by said position detecting portion and in the case where a distance between the two positions detected at a prescribed time interval has changed or in the case where a difference of moving directions of the two positions is within a prescribed range, and a step of determining said second gesture event in the case where two positions are detected simultaneously by said position detecting portion and in the case where an inclination of a straight line passing through the two positions detected at a prescribed time interval has changed by a prescribed angle.

23. The non-transitory computer-readable recording medium encoded with the content displaying program according to claim 17, wherein said state storing step includes a step of temporarily storing a scaling factor of said display image at the time point of the start of the gesture period, and said prioritized displaying step includes a step of, in the case where a gesture event corresponding to a process of changing a scaling factor of said display image has been determined as said first gesture event in said gesture event determining step, changing, on the basis of termination of said gesture period, the scaling factor of said display image to said temporarily stored scaling factor.

24. The non-transitory computer-readable recording medium encoded with the content displaying program according to claim 23, wherein said content displaying step includes a step of displaying an image of content on said display portion, and said display image generating step includes a step of generating an image for displaying said content.

* * * * *